United States Patent [19]
Kriewall et al.

[11] Patent Number: 5,691,959
[45] Date of Patent: Nov. 25, 1997

[54] STYLUS POSITION DIGITIZER USING ACOUSTIC WAVES

[75] Inventors: James A. Kriewall, Saratoga; Edwin F. Johnson, Sunnyvale; Alan R. Selfridge, Los Gatos; John P. Fairbanks, Sunnyvale; Verne H. Wilson, Belmont; Robert W. Parry, Santa Cruz; James D. Cummins, Union City, all of Calif.

[73] Assignee: Fujitsu, Ltd., Tokyo, Japan

[21] Appl. No.: 223,897

[22] Filed: Apr. 6, 1994

[51] Int. Cl.⁶ .................................................. G08C 21/00
[52] U.S. Cl. .......................... 367/129; 367/127; 367/907; 178/18
[58] Field of Search ............................. 367/907, 129, 367/127; 178/18; 327/68, 60, 90, 91

[56] References Cited

U.S. PATENT DOCUMENTS

| | | | |
|---|---|---|---|
| 3,571,510 | 3/1971 | Weir | 178/18 |
| 4,482,835 | 11/1984 | Bar-Cohen et al. | 310/327 |
| 4,845,684 | 7/1989 | Garwin et al. | 367/137 |
| 4,853,496 | 8/1989 | Taniishi | 178/18 |
| 4,862,153 | 8/1989 | Nakatani et al. | 340/719 |
| 4,891,474 | 1/1990 | Kelly | 178/18 |
| 4,931,783 | 6/1990 | Atkinson | 340/710 |
| 4,972,496 | 11/1990 | Sklarew | 382/13 |
| 4,973,800 | 11/1990 | Sindeband et al. | 178/18 |
| 4,980,518 | 12/1990 | Kobayashi et al. | 178/18 |
| 4,991,148 | 2/1991 | Gilchrist | 367/124 |
| 5,017,913 | 5/1991 | Kaneko et al. | 178/18 |
| 5,070,325 | 12/1991 | Tanaka et al. | 340/706 |
| 5,072,427 | 12/1991 | Knowles | 367/118 |
| 5,073,685 | 12/1991 | Kobayashi et al. | 178/18 |
| 5,091,920 | 2/1992 | Ikeda et al. | 327/68 |
| 5,097,102 | 3/1992 | Yoshimura et al. | 178/18 |
| 5,097,415 | 3/1992 | Yoshimura et al. | 178/18 |
| 5,130,522 | 7/1992 | Yamanouchi et al. | 235/492 |
| 5,142,106 | 8/1992 | Yoshimura et al. | 178/18 |
| 5,142,506 | 8/1992 | Edwards | 367/127 |
| 5,144,594 | 9/1992 | Gilchrist | 367/129 |
| 5,162,618 | 11/1992 | Knowles | 178/18 |
| 5,177,327 | 1/1993 | Knowles | 178/18 |
| 5,177,472 | 1/1993 | Taniishi et al. | 178/18 |
| 5,308,936 | 5/1994 | Biggs et al. | 178/18 |
| 5,379,269 | 1/1995 | Sindeband et al. | 367/127 |

FOREIGN PATENT DOCUMENTS

| | | | |
|---|---|---|---|
| 0544278A2 | 6/1993 | European Pat. Off. | G06K 11/14 |
| 3027923C2 | 4/1983 | Germany | G06F 3/033 |

OTHER PUBLICATIONS

E. Dieulesaint, et al., "Saw Graphic Sensor", 1978 Ultrasonics Symposium Proceedings, IEEE Cat #78H1344—ISU, 1978, pp.198–200.

Primary Examiner—Ian J. Lobo
Attorney, Agent, or Firm—Skjerven, Morrill, MacPherson, Franklin & Friel; David E. Steuber

[57] ABSTRACT

A digitizer uses acoustic waves originating from a stylus to determine the position of the stylus on a plate. The acoustic waves are introduced into the plate from the tip of the stylus and are detected by a plurality of detectors positioned at various points along the periphery of the plate. By sensing differences in the arrival times of the acoustic waves at the detectors, a microprocessor calculates the position of the stylus. In a preferred embodiment using a non-tethered stylus, four detectors are positioned at the corners of a rectangle, and the time differences are used as addresses in a lookup table, which is programmed to contain x and y coordinates corresponding to the time differences, Different embodiments may detect only the "fast" symmetrical waves or only the "slow" antisymmetrical waves generated in the plate, or may use the arrival times of both types of waves to determine the stylus position.

44 Claims, 29 Drawing Sheets

5,691,959

STYLUS POSITION DIGITIZER USING ACOUSTIC WAVES

FIELD OF THE INVENTION

This invention relates to digitizers that provide a digital representation of the position of a stylus on a flat surface, and in particular to a digitizer which makes use of some of the special properties of acoustic waves to detect the position of the stylus.

BACKGROUND OF THE INVENTION

Various types of stylus position digitizers are known, and they fall into two broad categories. In the first group, a transparent digitizing tablet overlies a liquid crystal or other display screen, generally separated from the display screen by a cushion of air. In the second group, an opaque digitizing tablet is positioned under the liquid crystal display. The first group commonly uses resistive, capacitive or electrostatic techniques to locate the position of the stylus. The second group normally uses infrared, electromagnetic or acoustic techniques for this purpose.

Stylus-based digitizers offer an attractive alternative to keyboards as a means of entering data into a computer. They can be made easily portable and can be used by persons who are uncomfortable working at a keyboard. Moreover, their applicability extends beyond computers to such devices as electronic note pads and blackboards.

Despite these advantages, these digitizers have not realized their full potential because each of the techniques and technologies used to sense the position of the stylus has significant drawbacks. For example, the resistive and electromagnetic approaches consume an excessive amount of power; the electromagnetic approaches produce high levels of radio frequency interference (RFI) and electromagnetic interference (EMI); the resistive approaches are susceptible to interference from external signals or from physical handling of the screen surface; the electrostatic and resistive approaches are above the screen and interfere with viewing; and finally, all of the prior approaches require a large data or signal processing capability, which results in high manufacturing costs and slow response times.

What is needed is a fast, highly accurate digitizer that consumes minimal power, is neither susceptible to, nor a source of, troublesome radiation, and is relatively inexpensive to manufacture. Moreover, a digitizer is more convenient to operate if the stylus is untethered.

SUMMARY OF THE INVENTION

The foregoing requirements are satisfied in a digitizer according to this invention, which uses acoustic waves within a solid plate as a means of determining the position of the stylus. A plurality of acoustic detectors are positioned at various points around the periphery of a plate, which is made of a solid material such as glass. Lamb waves are introduced into the plate from the tip of a stylus, by causing the tip to vibrate, bringing the tip into contact with the surface of the plate, and thereby causing the area of the plate underneath the tip to vibrate. The vibrations may be generated, for example, by applying an oscillatory voltage to a piezoelectric crystal which is mechanically linked or bonded to the stylus tip. In the preferred embodiment, the stylus is untethered, and the piezoelectric crystal is driven by a battery energized relaxation oscillator.

When the vibrating stylus tip is brought into contact with the surface of the plate, the Lamb waves radiate outward through the plate in concentric circles, and are sensed by the detectors positioned around the periphery of the plate. If the wavelength of the waves (determined by frequency of the vibrating stylus) is large in relation to the thickness of the plate, only two modes of Lamb waves are generated: symmetrical waves and antisymmetrical waves, the propagation velocity of the symmetrical waves through the plate being significantly greater than the speed of the antisymmetrical waves.

The arrival times of the Lamb waves at the various detectors are used to calculate the position of the stylus on the plate. This can be done in a number of different ways, by detecting both the "fast" symmetrical waves and the "slow" antisymmetrical waves or by detecting only one type of wave.

In the preferred embodiment, detectors designed to detect the antisymmetrical waves are positioned at the corners of a rectangular plate. The stylus generates the antisymmetrical waves in the form of separate bursts. The plate is divided into quadrants, and the first arrival of the burst at a detector is used to establish the quadrant in which the stylus is positioned. The time that it takes the burst to arrive at the next two detectors, which are located at corners of the plate on either side of the first detector, is determined in two separate counters. Each of these times represents a difference in the arrival times of the burst at two of the detectors, or the difference in the distances between the stylus and the two detectors. This distance differential defines a hyperbola with the two detectors as its foci. The first (central) detector and one of the other two (side) detectors constitute one set of foci; the first detector and the remaining detector constitute another set of foci. Therefore, the two distance differentials define a pair of intersecting hyperbolas. A microprocessor calculates the location of the point where the two hyperbolas intersect, and this defines the location of the stylus.

In the digitizer of this invention, the acoustic bursts which start the processing sequence have a low duty cycle. This minimizes the power required to operate the digitizer and maximizes its efficiency. This also allows all processing to be completed on a burst-to-burst basis and allows the digitizer to keep up with rapid handwriting strokes. Since only the relative times of arrival of the burst at the detector pairs is used to determine the position of the stylus, it is not necessary to know the time at which the burst originated at the stylus. This means that the stylus can be untethered, the resolution of these time differences is limited only by the clock rates at which the counters are driven and the burst detector circuitry, and thus high accuracy is possible. Alternatively, some accuracy can be traded off for reduced clock rates, which in turn simplifies the signal processing and reduces the power consumption of the digitizer. Since the acoustic waves are injected into and contained within the plate, the generation of RFI and EMI is limited. The digitizer is also highly immune to the effects of external signals and physical handling. Since no sensing elements are arrayed over the entire length and width of the plate, the detection circuitry and logic systems can easily be scaled to accommodate a wide range of plate sizes. Thus a variety of products can be manufactured with minimal development time and tooling and stocking requirements.

DESCRIPTION OF THE INVENTION

The digitizer of this invention operates by detecting and comparing the arrival times of acoustic waves transmitted from a stylus point source at detectors positioned around the periphery of a solid plate. A brief outline of the underlying acoustic and mathematical principles will first be given, and then the various components and subsystems of the preferred embodiment will be described.

Properties Of Lamb Waves

Figure 1A:
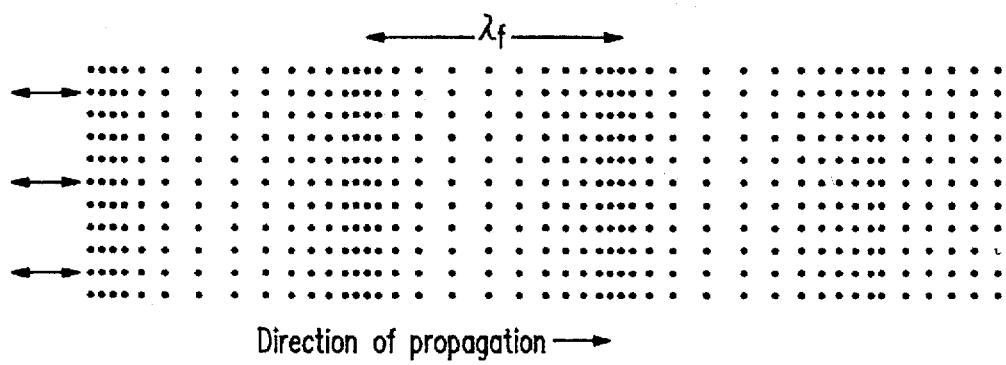
FIG. 1A illustrates, in exaggerated form, the movement of particles in an unbounded solid in the presence of a compressional acoustic wave.
Figure 1B:
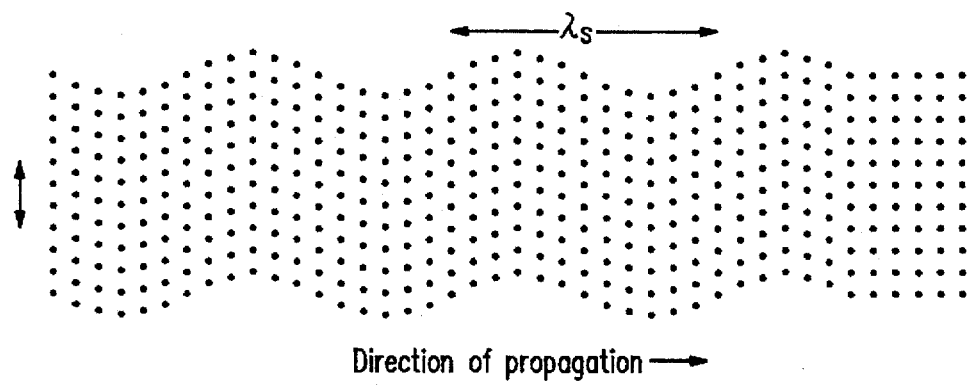
FIG. 1B illustrates, in exaggerated form, the movement of particles in an unbounded solid in the presence of a shear acoustic wave.

Two types of acoustic or stress waves can exist in an unbounded isotropic solid. One is like the acoustic wave in a gas and is frequently referred to as a compression or longitudinal wave. Here the particles of the solid move back and forth in the same direction that the wave is travelling (propagation direction), as illustrated in exaggerated form in FIG. 1A. The other type is frequently referred to as a shear wave. Here the particles of the solid move in a direction transverse to the propagation direction, as illustrated in exaggerated form in FIG. 1B. Of the two types, the compression wave has the fastest propagation velocity.

The nature of acoustic waves in an isotropic plate (i.e., a solid bounded on two sides) is much more complex. Generally speaking, the characteristics of these waveforms differ as the relationship between their wavelength and the thickness of the plate changes; or putting it another way, different "modes" predominate as this relationship changes. In regions where the wavelength is large in comparison to the width of the plate, Lamb found that there are two types of propagating modes, each of which is a complex mixture of compression and shear waves. The two modes are referred to as the symmetrical and antisymmetrical modes, and they are distinguished by the motion of the opposing surfaces of the plate referenced to its center line.

Figure 2A:
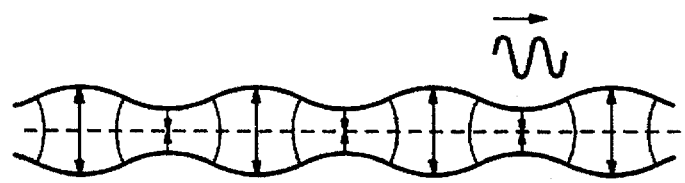
FIG. 2A illustrates, in exaggerated form, the behavior of a symmetrical Lamb wave in a solid plate.
Figure 2B:
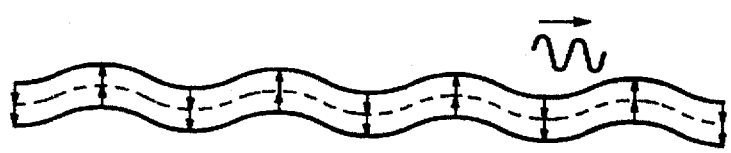
FIG. 2B illustrates, in exaggerated form, the behavior of an antisymmetrical Lamb wave in a solid plate.

FIGS. 2A and 2B illustrate the symmetrical and antisymmetrical modes, respectively, in an exaggerated fashion. In the symmetrical mode (FIG. 2A), the particles directly opposite each other on the two surfaces of the plate are moving away from each or toward each other as the wave passes by (i.e., the particle motions are symmetrical relative to the plate's center line). In the antisymmetrical mode (FIG. 2B), the particles on the two surfaces directly opposite each other both move up together or down together as the wave passes by (i.e., the particles are moving in opposite directions relative to the center line of the plate).

According to Lamb's theory, the lowest order symmetrical and antisymmetrical modes propagate at all frequencies of excitation. As the excitation frequency is increased, additional modes begin to propagate.

When the wavelength is substantially greater than the thickness of the plate (e.g., a ratio of 2:1 or greater), only the lowest-order symmetrical and antisymmetrical modes are propagated. In this regime, the symmetrical mode is mainly longitudinal in character; its shear motion is very weak. Moreover, its propagation velocity is only slightly less than that of a longitudinal wave in an unbounded solid, and it is nearly free of frequency dispersion. In contrast, the lowest-order antisymmetrical mode is rich in both longitudinal and shear wave types. It propagates at a much slower rate than the symmetrical mode and is quite frequency dispersive. Frequency dispersion refers to the tendency of the waves in a short burst or pulse to spread out as they travel through the plate, thereby leading to inaccuracies in the detection of the wave burst.

As the excitation frequency is increased, the shear character of the symmetrical mode grows in strength. As a result, the symmetrical mode's propagation velocity decreases, and it becomes more frequency dispersive. Generally speaking, as the frequency increases the symmetrical and antisymmetrical modes become more like each other.

At much higher frequencies, for which the wavelengths of the symmetrical and antisymmetrical modes are small compared with the plate thickness, both modes have the same longitudinal and shear character and both propagate at the same velocity. Moreover, they are relatively free of frequency dispersion. In this regime, it is more useful to view the waveforms in the plate as Rayleigh waves than as Lamb waves. There is no clear line at which Rayleigh's theory becomes more useful, but this probably happens somewhere in the neighborhood of 10 MHz for commonly uses glasses. Rayleigh waves have a disadvantage in that, being propagated nearer the surface, they are much more affected by inadvertent contact with the plate surface (by a human hand, for example) than Lamb waves.

Symmetrical ($S_o$) and antisymmetrical ($A_o$) waves differ from each other both in the velocity at which they are propagated through the plate and the manner in which they may be detected by sensing devices. The propagation velocity of $S_o$ waves ($c_p$) is greater than the propagation velocity of $A_o$ waves ($c_s$). For a crown glass plate 0.026 inches thick the values of $c_p$ and $c_s$ are approximately 5,430 meters/sec and 3,310 meters/sec, respectively, at an excitation frequency of 1 MHz.

Figure 3A:
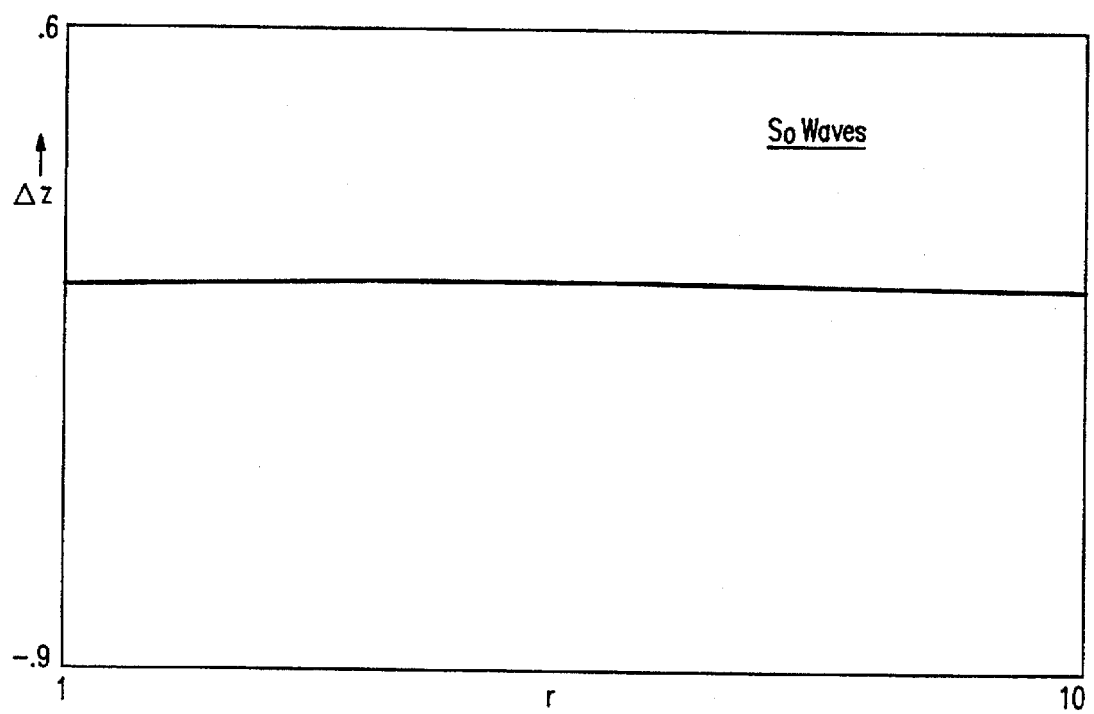
FIG. 3A illustrates vertical displacement along the surface of a plate in the presence of the lowest-order symmetrical Lamb wave.
Figure 3B:
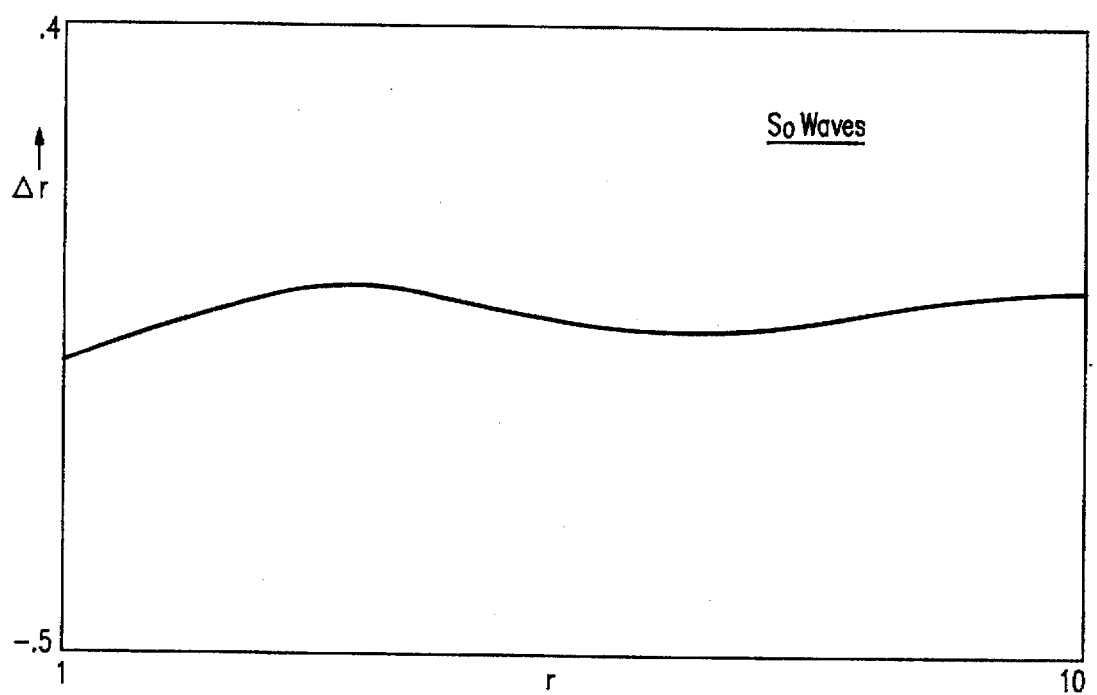
FIG. 3B illustrates radial displacement along the surface of a plate in the presence of the lowest-order symmetrical Lamb wave.
Figure 4A:
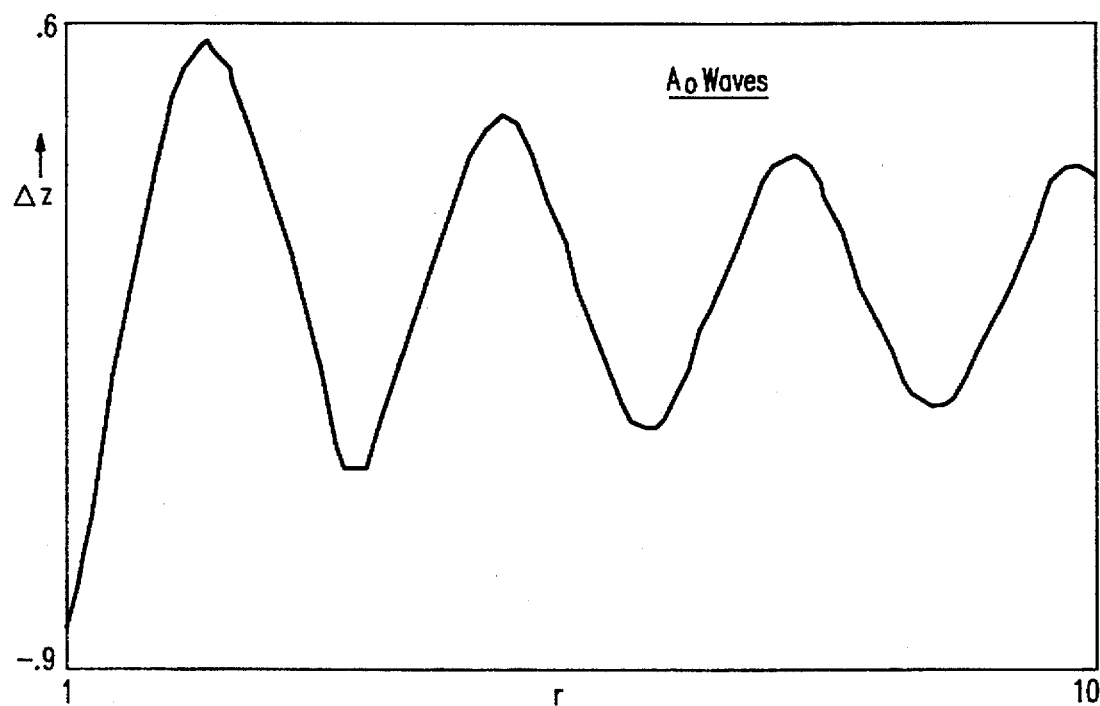
FIG. 4A illustrates vertical displacement along the surface of a plate in the presence of the lowest-order antisymmetrical Lamb wave.
Figure 4B:
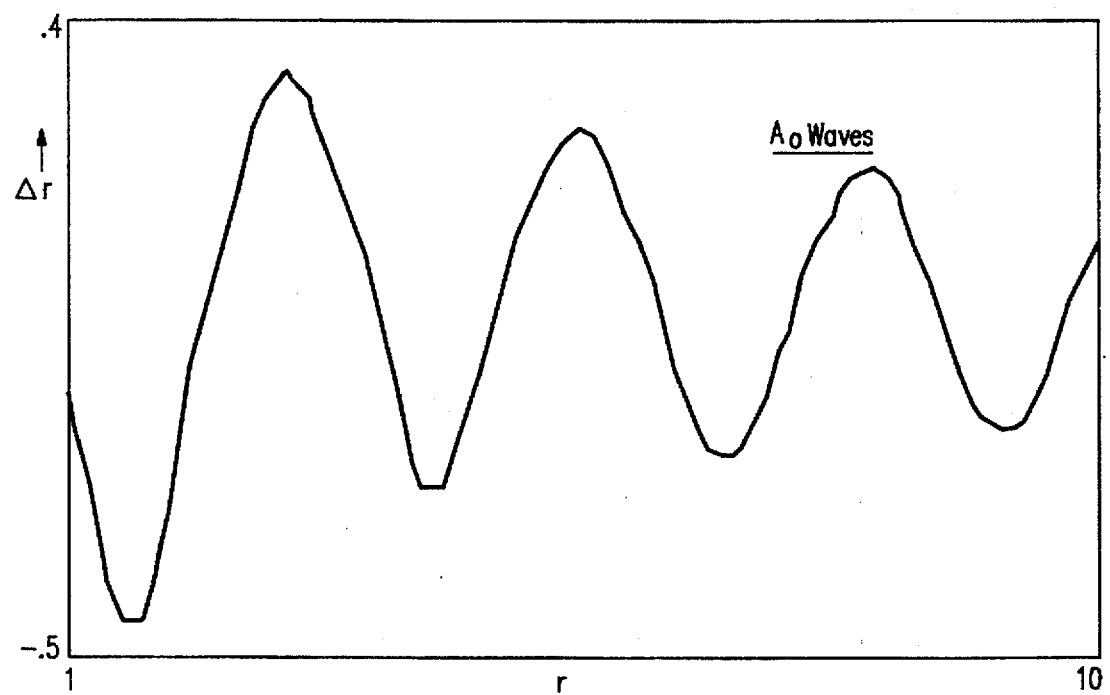
FIG. 4B illustrates radial displacement along the surface of a plate in the presence of the lowest-order antisymmetrical Lamb wave.

FIGS. 3 and 4 illustrate the displacement of the surface of a plate in the presence of the $S_o$ and $A_o$ modes, respectively, at a given instant. The excitation source is a circular piston mounted on one face of the plate. In FIGS. 3A and 4A, the vertical axis represents a displacement normal to the surface of the glass (z direction), and in FIGS. 3B and 4B, the vertical axis represents a displacement parallel to the surface of the glass (r direction). As is apparent from FIGS. 4A and 4B, the $A_o$ wave shows considerable displacement in both the z and r directions, with the waveforms being approximately 90° out of phase with each other. In contrast, the $S_o$ wave shows little displacement in the z direction (FIG. 3A) and a modest displacement in the r direction (FIG. 3B). Thus, as a general matter, the $A_o$ waves are considerably easier to detect, and the $S_o$ waves may be detected only by sensors which are able to detect movement in the r direction.

Further information on the theory of Lamb waves is found in *Stress Waves in Solids*, H. Kolsky, Dover (1963) and *Acoustic Fields and Waves in Solids*, B. A. Auld, Vols. I and II, R. E. Krieger (1990).

To summarize this discussion, there are three characteristics of the waves that are especially significant in the design of a digitizer in accordance with this invention:
1. The velocity at which the waves propagate through the plate. In particular, if two different types of waves (e.g., the symmetrical and antisymmetrical modes) have different propagation velocities, the actual distance between the stylus and the detector can be determined.
2. The ease of detecting the waves. As noted above, generally speaking, the antisymmetrical mode is easier to detect.
3. The frequency dispersion of the waves.

As the discussion below indicates, the design of a digitizer in accordance with this invention normally involves a trade-off among these factors.

Overall System

Figure 5:
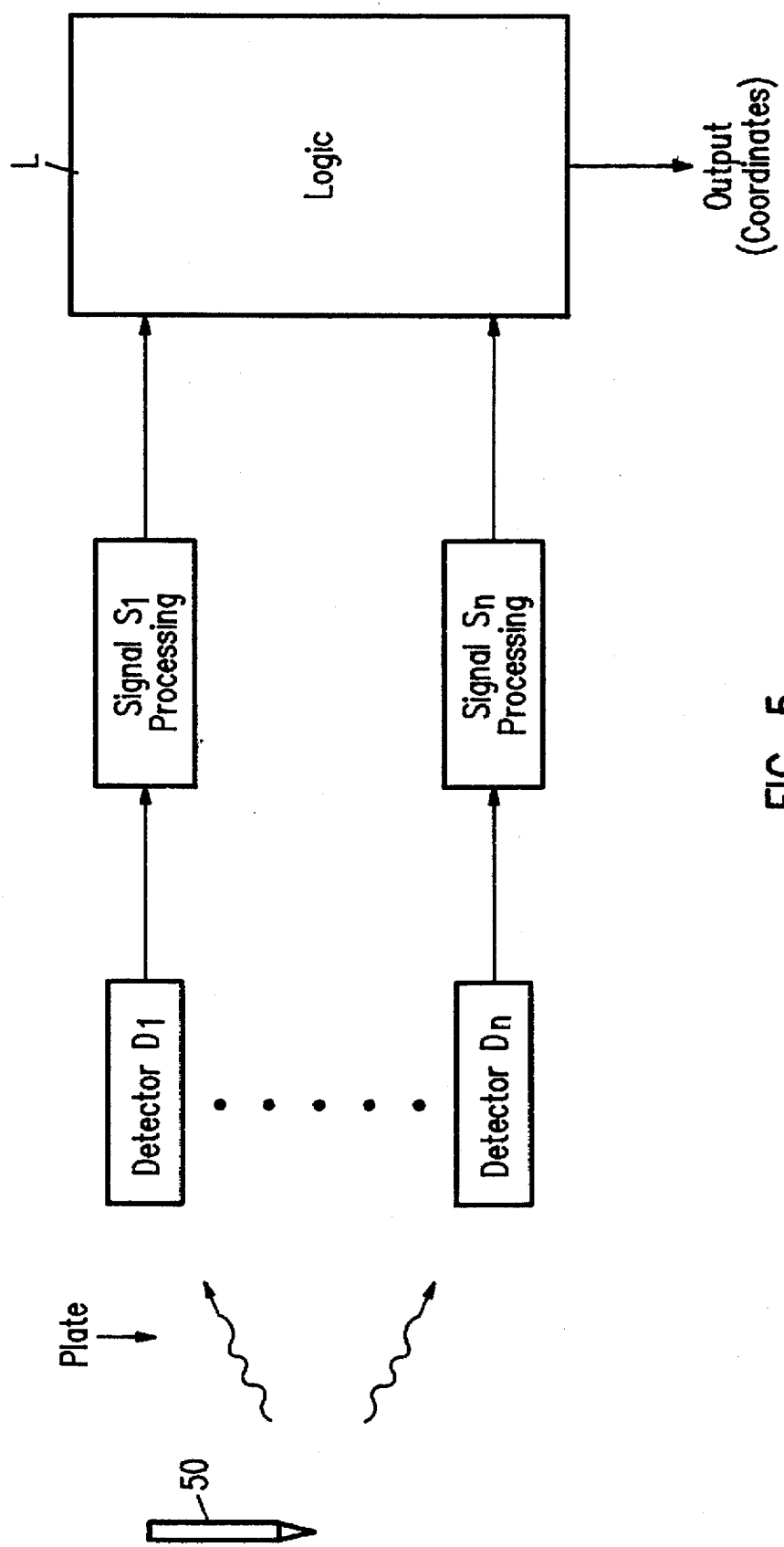
FIG. 5 illustrates a general block diagram of a digitizer in accordance with the invention.

FIG. 5 illustrates a general block diagram of a digitizer in accordance with the invention. A stylus 50 has a vibrating tip which is brought into contact with a solid plate. The contact region between the stylus tip and the plate serves as the source for acoustic waves which radiate outward in concentric circles. A plurality of detectors $D_1$ through $D_n$ are positioned at various locations around the periphery of the plate and detect the arrival of the acoustic waves from stylus 50. One or more types of waves may be detected. Signal processing units $S_1$ through $S_n$ are associated with detectors $D_1$–$D_n$ and deliver outputs at corresponding arrival times for the waveforms sensed by the detectors. A logic unit L uses the sensed differences in the arrival times of the waveforms to calculate the position of the stylus 50 on the plate, and delivers an output representing the coordinates of the stylus. Any system of coordinates, e.g., rectangular or polar, may be used in different embodiments according to the invention.

Figure 6:
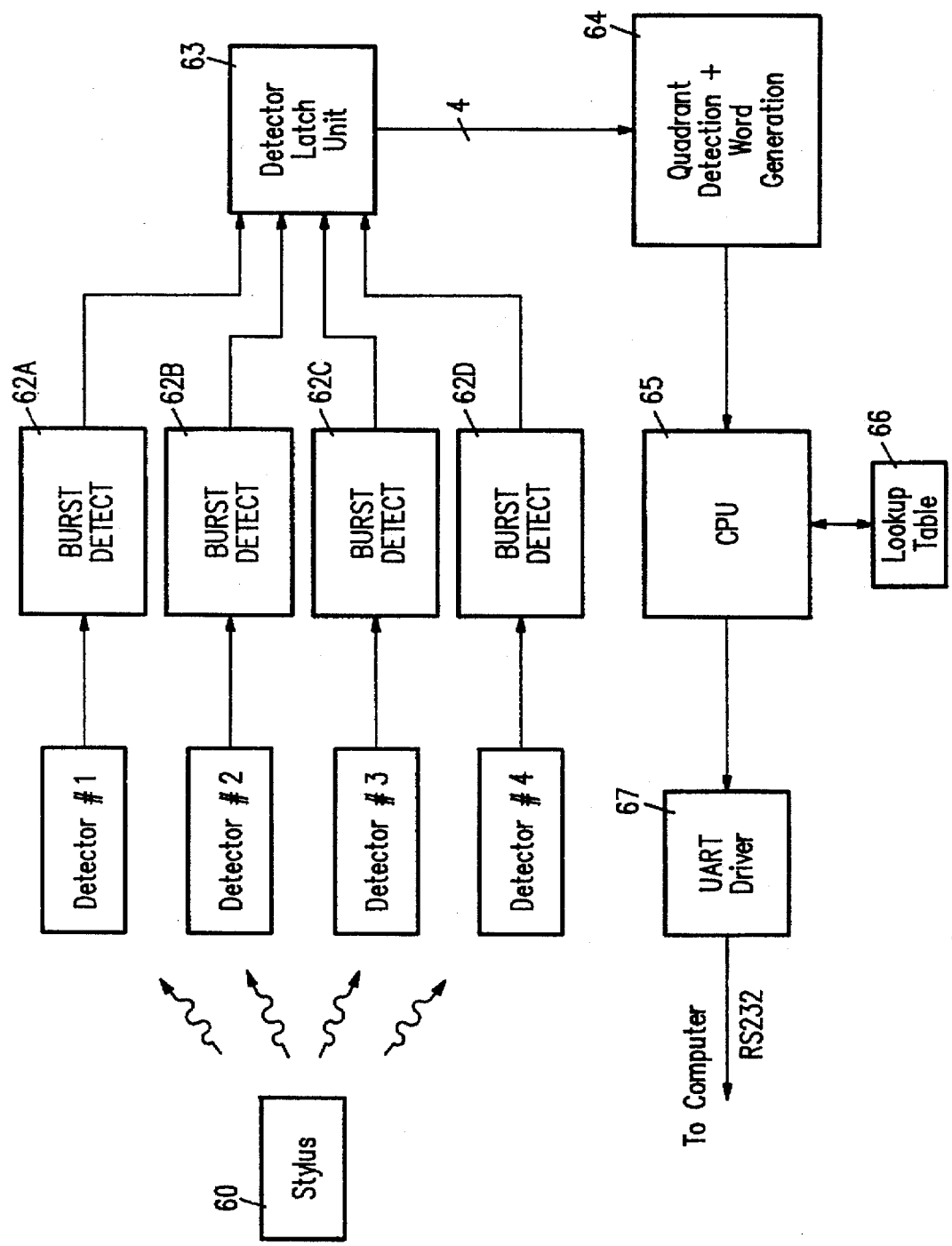
FIG. 6 illustrates a block diagram of a preferred embodiment in accordance with the invention.

A block diagram of a preferred embodiment of the invention is illustrated in FIG. 6. Acoustic waves generated by a stylus 60 are detected by four detectors 1–4, which are positioned at the corners of a rectangular plate 61 (shown in FIG. 7A). The outputs of detectors 1–4 are delivered to burst detection units 62A–62D, which amplify and process the raw voltage signals generated by detectors 1–4. Burst detection units 62A–62D deliver outputs through a detector latch unit 63 to a quadrant detection and word generation unit 64. Unit 64 identifies the quadrant of the plate in which the stylus is located and, using a pair of counters, generates binary words representative of the differences in the arrival times of the acoustic wave at individual detectors 1–4. A central processing unit (CPU) 65 processes this information and, using a lookup table 66, determines the position of stylus 60 on the plate. This information is passed through a universal asynchronous receiver transmitter (UART) driver 67 and then to a computer (not shown).

Figure 7A:
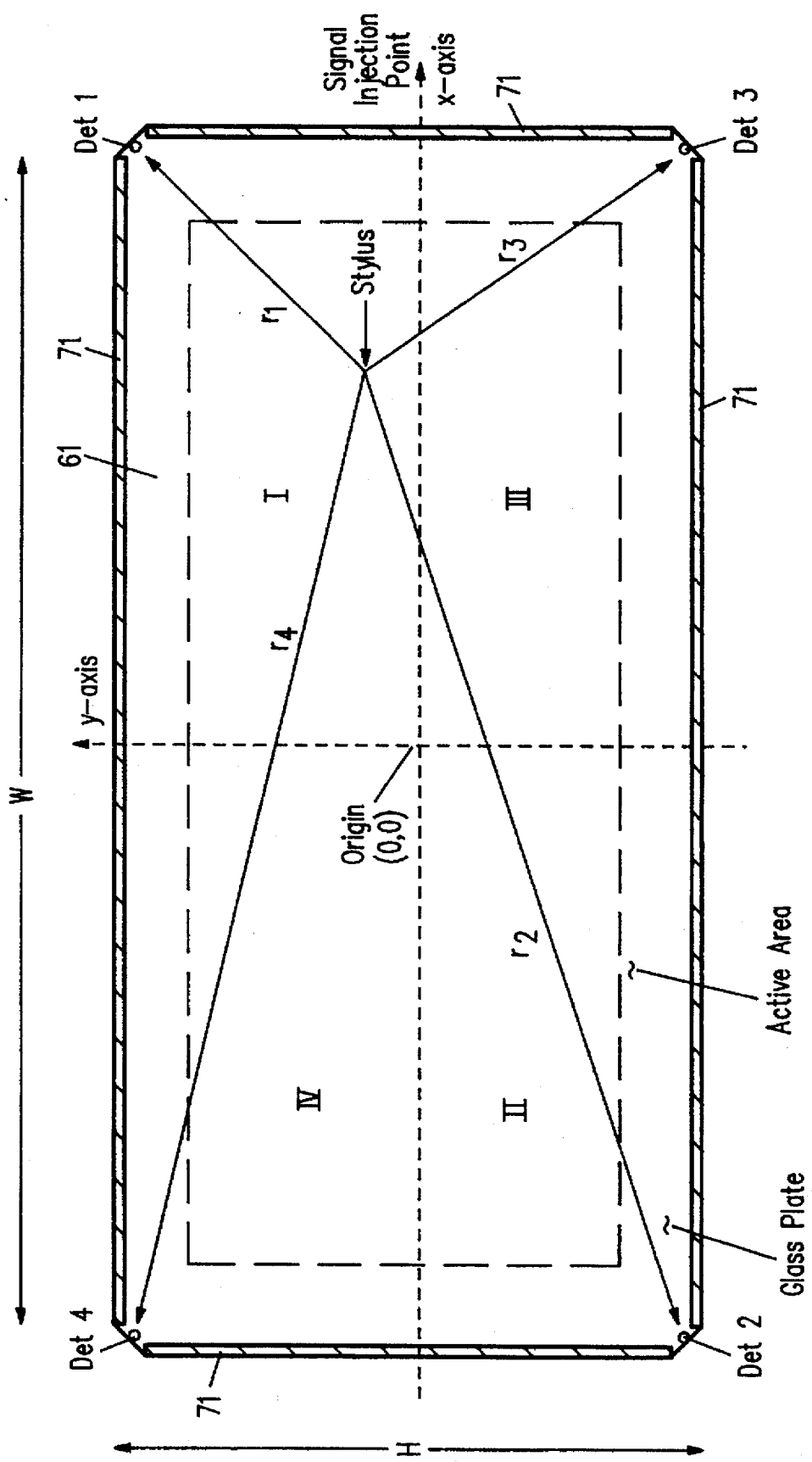
FIG. 7A illustrates a plan view of the plate.

FIG. 7A illustrates the general layout of plate 61, which is rectangular and has a width W and a height H. Detectors 1–4 are positioned at the four corners of plate 61 in a reflected binary code or "Gray code" arrangement (i.e., detector 1 is at the upper right corner of plate 61, and detectors 3, 2 and 4 are positioned at the other corners of plate 61 in a clockwise direction). See J. Peatman, *Design With Microcontrollers*, McGraw-Hill, 1988, p. 393. The reason for this arrangement will be explained below. Plate 61 is divided into four quadrants I–IV, which correspond to detectors 1–4, respectively, and which surround a central point of origin (0,0). An illustrative position of stylus 60 is shown, with vectors $r_1$, $r_2$, $r_3$, and $r_4$ defining the distance from the location of stylus 60 to detectors 1–4, respectively. Unless otherwise stated, this nomenclature will be used for defining the location of stylus 60 (i.e., $r_1$ represents the distance from stylus 60 to detector 1, etc.).

Plate 61 is liquid crystal display (LCD) glass and is 0.026 inches thick. The width (W) of plate 61 is 7.9 inches and its height (H) is 3.9 inches. The values of $c_p$ and $c_s$ for this type of glass are 5,430 meters/sec and 3,310 meters/sec, respectively. Since, as noted below, stylus 60 vibrates at 1 MHz, the wavelengths for the $S_o$ and $A_o$ waves are $5.43 \times 10^{-3}$ meters and $3.31 \times 10^{-3}$ meters, respectively. To avoid inaccuracies that may occur near the edges of plate 61, an "active" area for stylus operation is defined in a central region of the plate.

FIG. 7A also illustrates that the corners of plate 61 are beveled. A dampening material 71 is provided along the periphery of plate 61 except for the beveled portions.

Figure 7B:
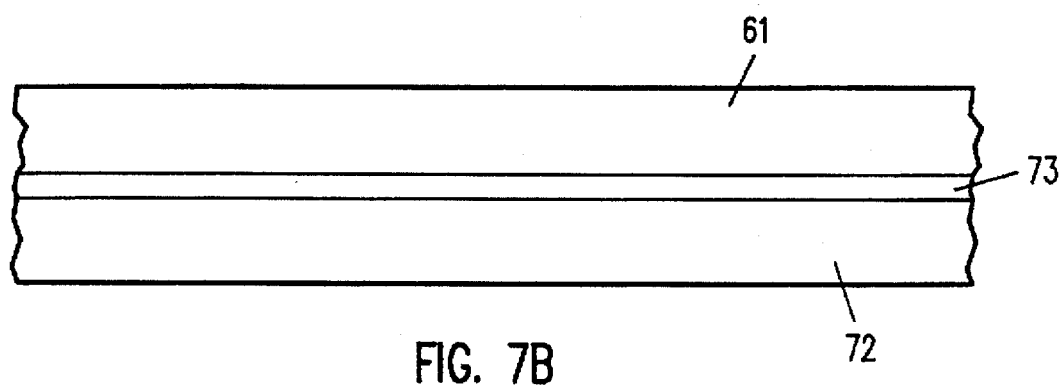
FIG. 7B illustrates a cross-sectional view of the plate.

FIG. 7B illustrates a cross-sectional view of plate 61. Underneath plate 61 is a second plate 72 made of LCD glass, in which graphics are generated using known technology. Plates 61 and 72 are separated by an air gap 73. An anti-glare material may be coated on the top surface of LCD glass plate 72.

Stylus

Figure 8:
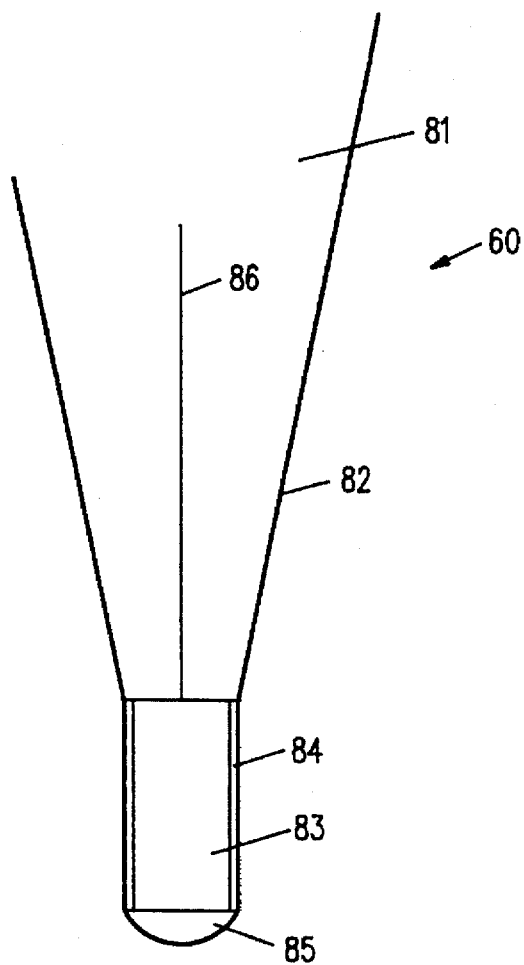
FIG. 8 illustrates a cross-sectional view taken through the central axis of the stylus.

FIG. 8 illustrates a cross-sectional view taken along the central axis of stylus 60. Stylus 60 includes a phenolic plastic handle 81 enclosed by a ground shield 82, which is a metallic paint. A piezoelectric (ceramic) crystal 83, which is cylindrical in shape, is bonded to handle 81 and separated from ground shield 82 by means of an insulating layer 84. A spherical or spheroidal stylus tip 85 is bonded to the lower end of piezoelectric crystal 83. The surface of tip 85 is spherical or spheroidal to insure that acoustic waves will be properly introduced into plate 61 if stylus 60 as held at an oblique angle with respect to the surface of plate 61. Moreover, a spheroidal tip concentrates the contact force applied to the stylus onto a small area. This results in a high contact pressure over a small area, which helps to establish good acoustic contact (often referred to as Hertzian contact). A "hot" wire 86 contacts the upper edge of crystal 83. The lower edge of crystal 83 is connected to shield 82 and grounded.

Figure 9A:
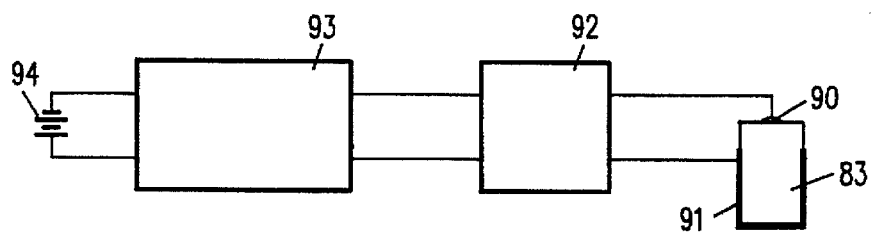
FIG. 9A illustrates a schematic block diagram of the electrical circuit in the stylus.

FIG. 9A illustrates a schematic block diagram of the electrical circuitry in stylus 60. Piezoelectric crystal 83 has an electrical contact 90 at one end and an electrical contact 91 which encloses the other end of crystal 83. Contacts 90 and 91 are connected to a tuned circuit 92 (e.g., an RCL circuit), which is driven by a relaxation oscillator 93. A battery 94 provides power for the circuit. In this embodiment, tuned circuit 92 oscillates at 1 MHz. Battery 94 charges relaxation oscillator 93 until it reaches a set point, when it delivers energy to tuned circuit 92. Relaxation oscillator 93 is set such that it oscillates at 125 Hz. Each time tuned circuit 92 is energized, it oscillates through about 2 cycles at 1 MHz, or for 2 μsec. The frequency of tuned circuit 93 may be varied but in this embodiment it is preferably in the range of from 500 kHz to 2 MHz. The upper value varies inversely with the thickness of plate 61 and may be increased if higher modes of Lamb waves are used.

Figure 9B:
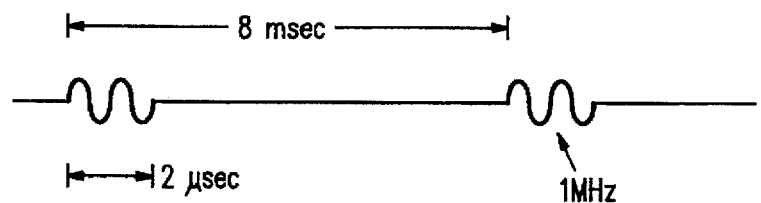
FIG. 9B illustrates in simplified form the acoustic waves produced by the stylus.

FIG. 9B illustrates in simplified form the waveform which appears at tuned circuit 92 and piezoelectric crystal 83. (FIG. 9B is not drawn to scale.) Each burst of the oscillating signal lasts about 2 μsec, and the bursts are separated by 8 msec. Thus the "duty cycle" of this waveform is only about 0.025%, and this feature keeps the drain on battery 94 to a minimum.

Various circuits which could be used for relaxation oscillator 93 and tuned circuit 92 are well known in the art and will not be described here.

The Detectors

The structure and orientation of detectors 1-4 are determined by whether the $S_o$ and $A_o$ waves are to be detected. In this embodiment, the $A_o$ or "slow" wave is detected. As shown in FIGS. 3 and 4, $A_o$ waves generate a much greater motion normal to the surface of a plate than do $S_o$ waves. To take advantage of this difference, detectors 1-4 are mounted on the top surface of plate 61 and are designed to detect vibrations perpendicular to the surface.

Figure 10A:
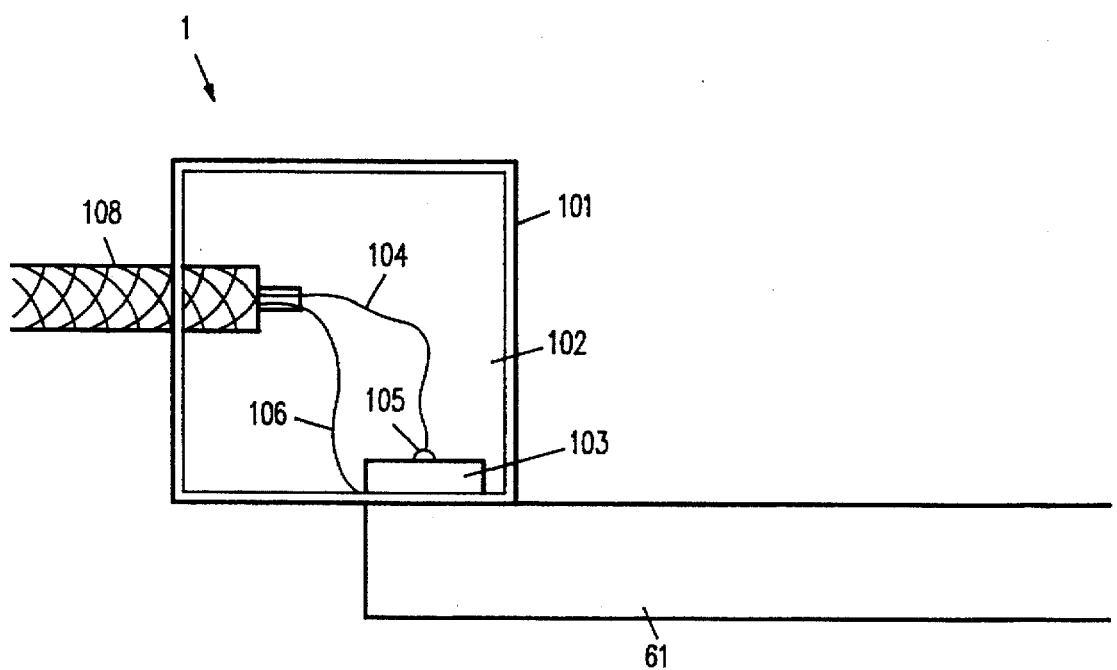
FIG. 10A illustrates a cross-sectional view of the detectors.

FIG. 10A illustrates a cross-sectional view of detector 1 (which is identical in structure to detectors 2-4). Overlying the surface of detector 1 is a ground shield 101 which is filled with an elastomeric backing 102. Ground shield 101 may be a Cr/Au layer about 2000 Å thick, and backing 102 may advantageously consist of Emerson Cummings ECO-GEL 1265 mixed with 1 μm tungsten powder. The $A_o$ waves in glass plate 70 are sensed by a piezoelectric ceramic crystal 103, which in this embodiment is in the shape of a cylinder 0.032 inches in diameter and 0.003 inches thick. This thickness makes crystal 103 resonant at about 30 MHz, but because it is backed with elastomeric backing 102, which is an acoustically heavy material, crystal 103 delivers an adequate signal at 1 MHz into a high electrical impedance. As noted above, it is primarily sensitive to vibrations normal to the surface of glass 61, and these are primarily due to the $A_o$ mode of propagation. To maximize crystal 103's sensitivity to these vibrations, it is poled in the vertical direction.

A lead 104 is connected to a contact 105 which is made to metallization placed on top of crystal 103; and a lead 106 is connected to metallization placed between crystal 103 and glass plate 61, typically used as both a ground and shield electrode. Leads 104 and 106 are connected into a coaxial cable 108 which leads from detector 1. Contacts may be made to either ceramic or glass metallizations with silver epoxy or solder.

Figure 10B:
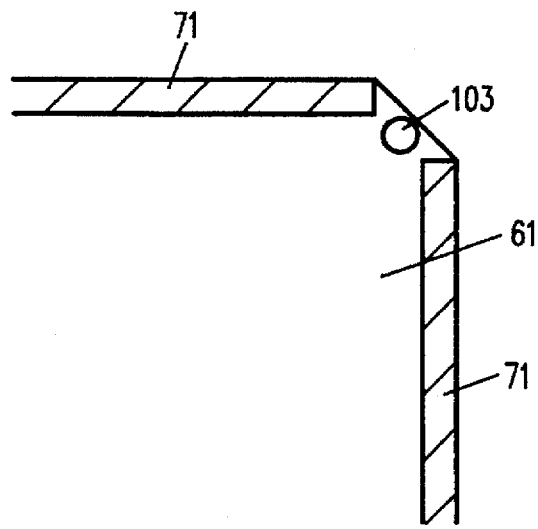
FIG. 10B illustrates a plan view of a corner of the plate showing a detector.
Figure 10C:
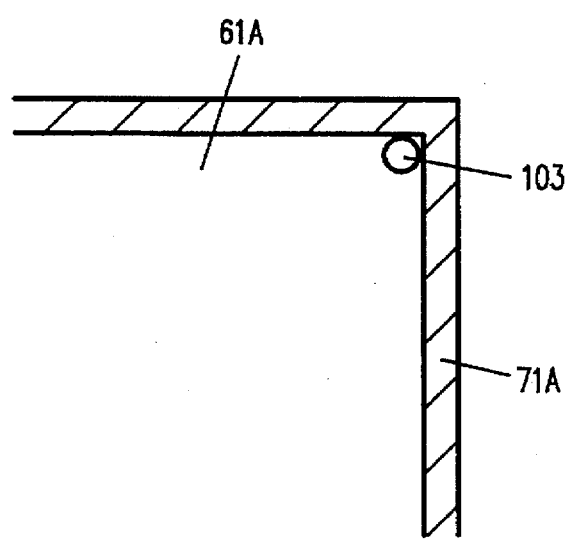
FIG. 10C illustrates a plan view of an alternative configuration of a corner of the plate.

FIG. 10B illustrates a detailed plan view of crystal 103 at a beveled corner of plate 61. Dampening material 71 extends along the edges of plate 61 to the ends of the beveled corner. FIG. 10C illustrates an alternative arrangement for the placement of the detector at the corner of the plate. The corner of a plate 61A is not beveled, and dampening material 71A extends behind detector 103, which is placed immediately in front of dampening material 71A. While in FIGS. 10A-10C, crystal 103 is shown mounted on the top side of plate 61, the $A_o$ waves (see FIG. 2B) would also be detected by mounting crystal 103 on the bottom of plate 61.

As detectors 1-4 receive the bursts of acoustic waves generated by stylus 60, they in turn generate voltage signals on leads 104 and 106 which closely mirror the Lamb waves which flow through plate 61. Thus the electrical signals appearing on leads 104 and 106 are similar to the acoustic waves illustrated in FIG. 9B.

Dampening

Figure 11:
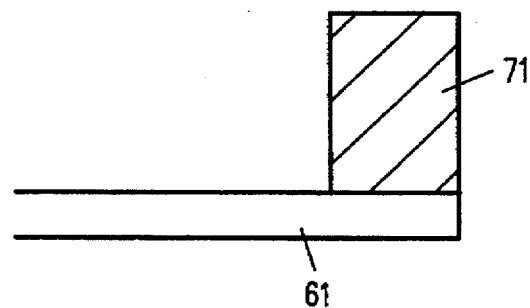
FIG. 11 illustrates a vertical cross-sectional view of the dampening material.

When the acoustic waves reach the edges of plate 61, it is important that they not be reflected back into the plate where they could create spurious responses at detectors 1-4. To avoid this problem, dampening material 71 is placed along the edges of plate 61, as shown in FIGS. 7 and 10B. FIG. 11 illustrates a vertical cross-sectional view of dampening material 71. As indicated, dampening material 71 is rectangular in cross-section, and in the preferred embodiment has a height of ¼ inch and width of ⅛ inch. Dampening material 71 preferably consists of ECOGEL 1265 filled with 1 μm tungsten powder. It is bonded to plate 61 with pure ECOGEL 1265.

Burst Detection Units

As stylus 60 moves along the surface of plate 61, the strength (amplitude) of the acoustic waves received by detectors 1–4 will vary depending on their proximity to the stylus. The raw electrical signals ("voltage bursts") generated by detectors 1–4 will likewise reflect these variations. In order to accurately read and compare the arrival times of the acoustic wave bursts, a means must be provided for sensing the same portion of each corresponding voltage burst that is generated by detectors 1–4.

The most accurate way to perform the burst detection function would be to detect the first evidence of the travelling acoustic waves. This is virtually impossible, however, because of the nature of the waveforms. Since the $A_o$ wave arrives after the $S_o$ wave, and since the detectors do not reject all of the $S_o$ waveforms, the portion of the $S_o$ waves which show up in the detector output represents noise which must be rejected by the burst detection circuitry. The signal to be detected comes from a piezo acoustic device which creates an acoustic wave with a mechanical disturbance inside the piezo device. The disturbance takes time to go from zero to a maximum value. Therefore, a threshold must be chosen above which the signal is assumed to be present and below which the electrical disturbances are assumed to be some sort of noise which must be rejected. Choice of a threshold presents certain problems since the amplitude of the waveform can vary by at least an order of magnitude over the area of the plate, and even more when variations in the pressure with which different users apply stylus 60 to the plate are considered. Moreover, even with a damping material at the edge of the plate, a small amount of the waves are reflected, and this constitutes an additional source of noise.

Empirical tests indicate that detecting the peak value of each burst yields an accurate measurement in time, plus or minus one or two cycles. Detecting a point some distance down from the peak reduces this inaccuracy proportionately and also serves to normalize out variations in the peak signal values. Moreover, if the burst detection circuitry can interpolate between cycles, then the relative inaccuracy from one point to another can be improved significantly even though the absolute inaccuracy is not changed. For these reasons, it was decided to detect each burst at a constant percentage of the peak value of the preceding burst. The percentage used was approximately 50%.

This function is performed by burst detection units 62A–62D. Essentially, these units operate by allowing each voltage burst to establish a "peak" and sensing the next voltage burst at a fixed percentage down from that peak. The operation of burst detection units 62A–62D is based on the assumption that the position of stylus 60 and hence the amplitude of the acoustic waves does not change significantly from burst to burst, and that a peak established by a given burst remains substantially valid for the next burst.

Figure 12:
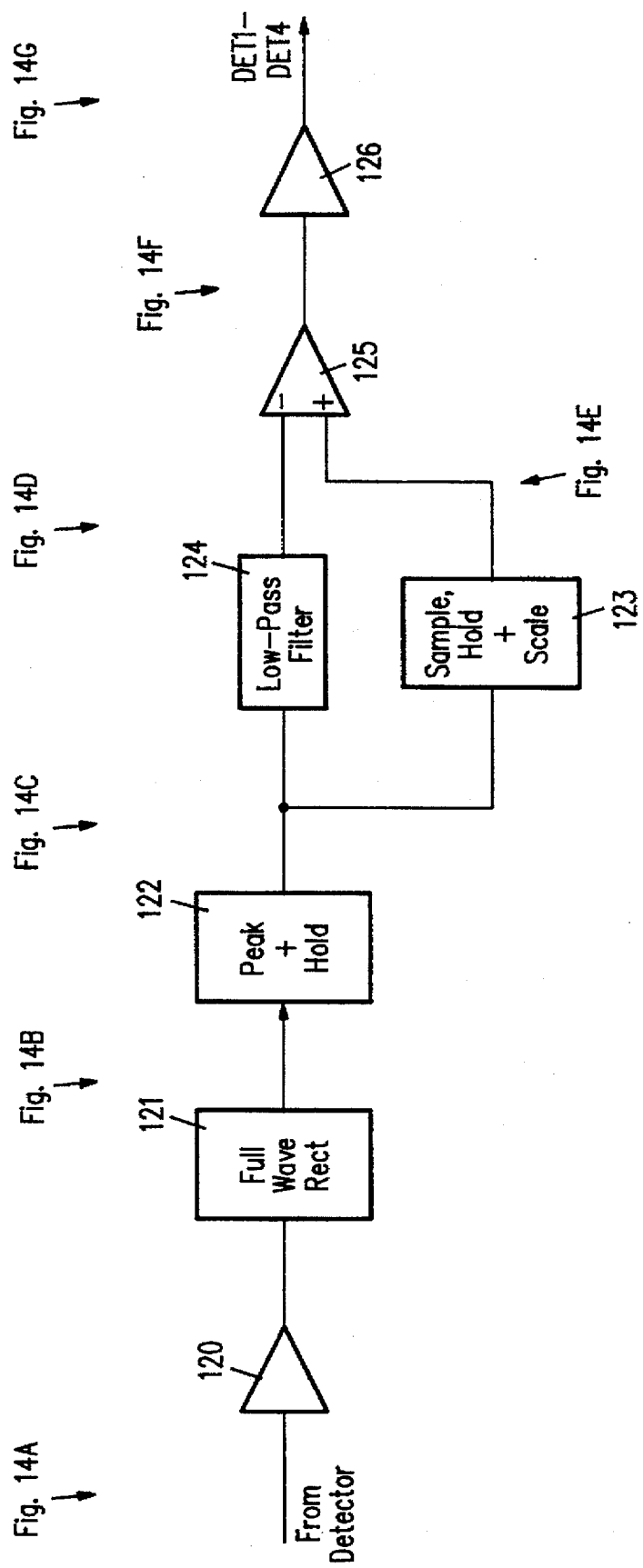
FIG. 12 illustrates a block diagram of the burst detection unit.

FIG. 12 illustrates a block diagram of burst detection units 62A–62D. The output from one of detectors 1–4 is passed to the input of an amplifier 120. The amplified signal then goes through a full-wave rectifier 121 and a peak and hold circuit 122. The output of peak and hold circuit 122 is split into two paths. One path passes through a low pass filter 124 to the negative input of a comparator 125. The other path goes through a sample, hold and scale circuit 123 which peak detects, holds and scales the signal before applying it to the positive input of comparator 125. The output of comparator 125 is passed through an inverter 126.

Figure 13A:
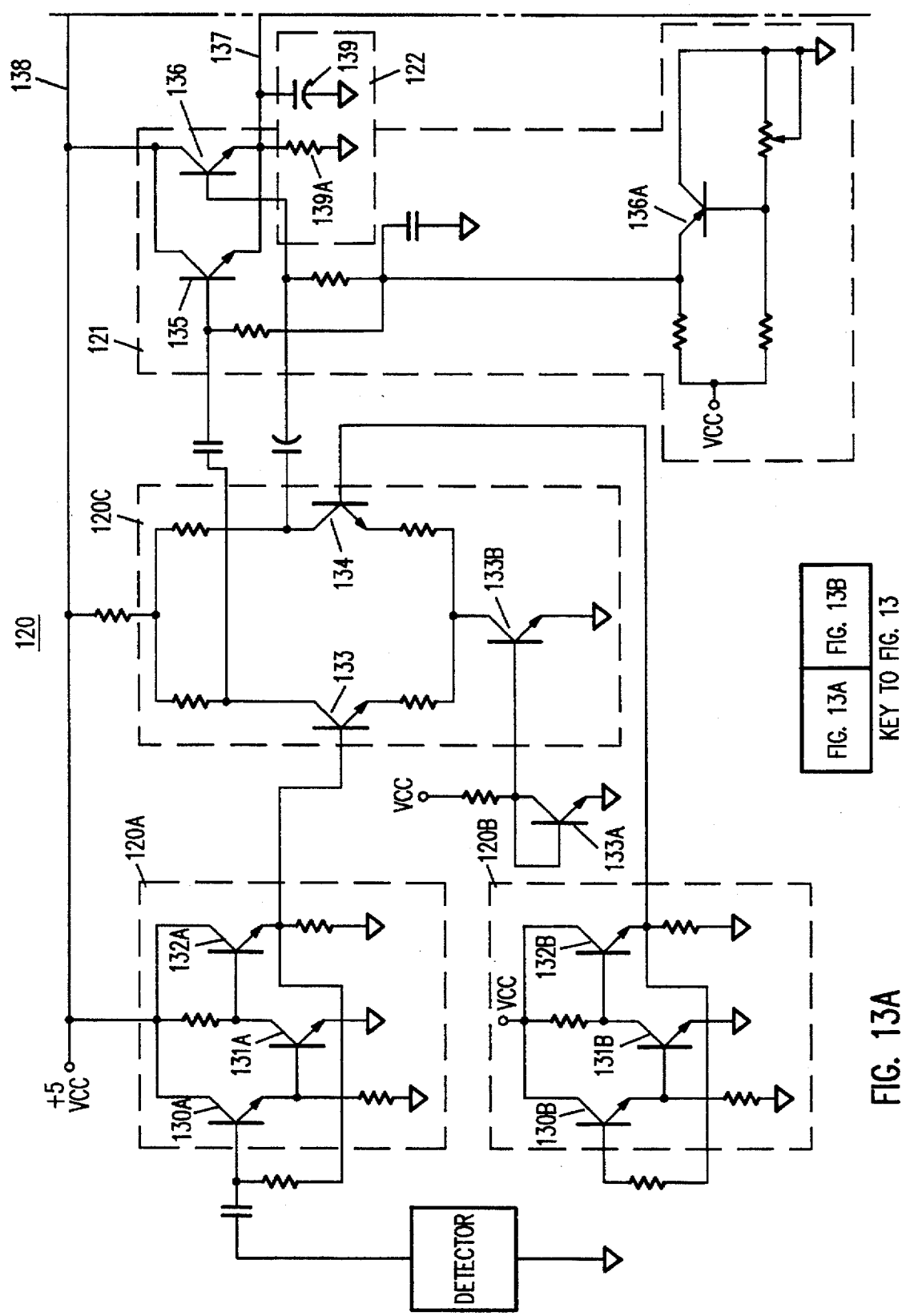
FIGS. 13A and 13B illustrate a circuit diagram of the burst detection unit.
Figure 13B:
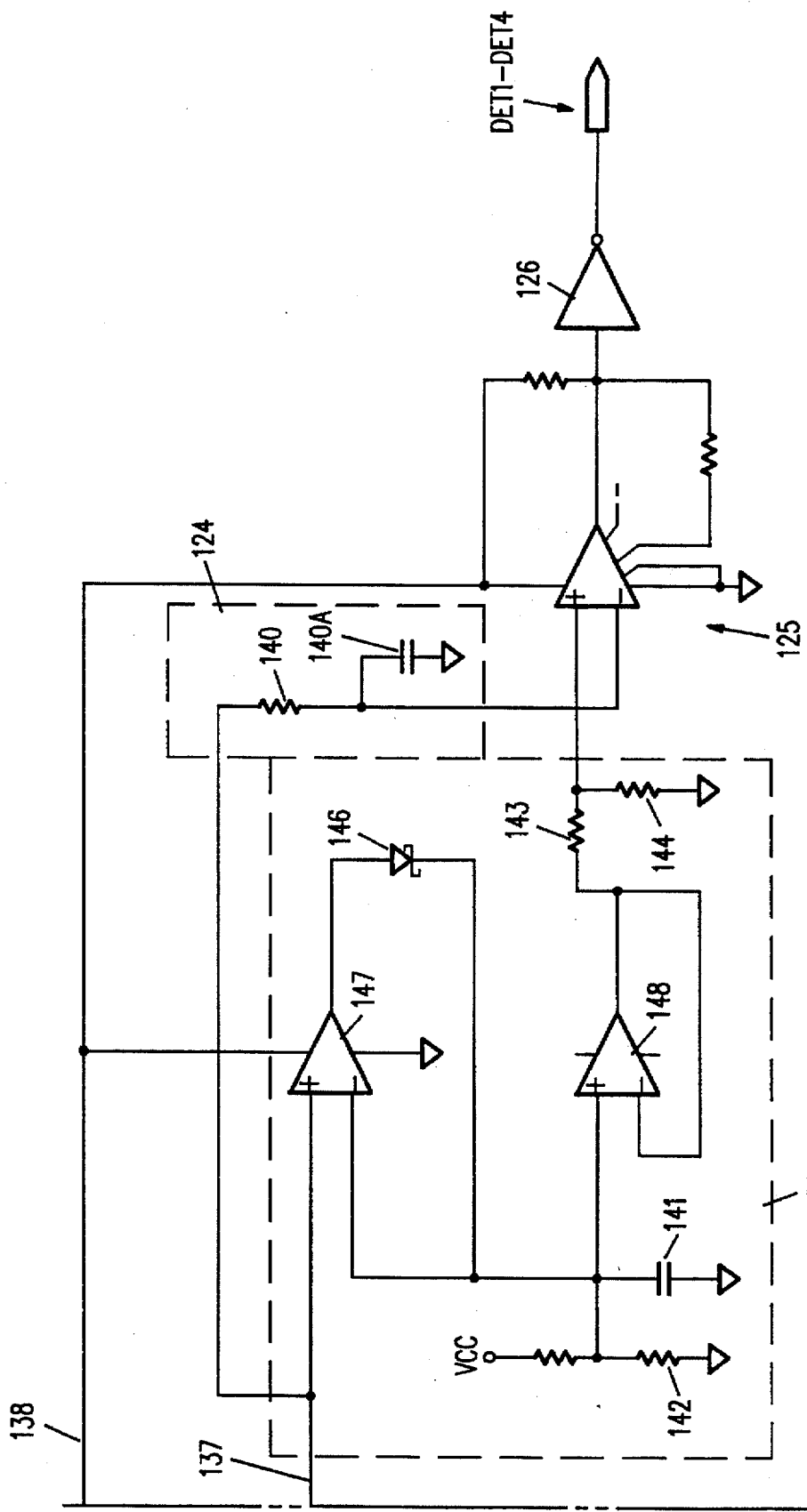

FIGS. 13A and 13B illustrate a circuit diagram for burst detection circuits 62A–62D. Amplifier 120 includes two shunt-series feedback amplifiers 120A and 120B and a differential amplifier 120C. Amplifiers 120A and 120B are identical and contain transistors 130A, 131A and 132A, and transistors 130B, 131B and 132B, respectively. Amplifier 120B could be used to process the output of a second detector positioned below plate 61. In this embodiment, however, there is no such detector, and amplifier 120B acts as a voltage divider, providing a balanced, temperature stable DC voltage to differential amplifier 120C. Differential amplifier 120C includes transistors 133 and 134. Bias transistors 133A and 133B act as a current source for transistors 133 and 134. Amplifier 120C has a high gain and is capable of combining signals from amplifiers 120A and 120B (if both of them were connected to detectors) or to amplify the signal from amplifier 120A alone. The input signal to differential amplifier 120C, whether from one or two inputs, is split into two signals, 180° out of phase with one another, by transistors 133 and 134. In this embodiment, the input to the base of transistor 134 stays constant, moving only as necessary to compensate for temperature changes. Since amplifiers 120A and 120B are AC coupled and identical in design, as the temperature changes the variations on the base-emitter junction voltages tend to track each other, so that the DC voltages to transistors 133 and 134 will be equal.

Full-wave rectifier 121 includes transistors 135 and 136, as well as a bias transistor 136A which is used for temperature compensation. The output of full-wave rectifier 121 charges peak and hold circuit 122, which contains a capacitor 139. Capacitor 139 decays at a rate determined primarily by the values of capacitor 139 and a resistor 139A. The output of peak and hold circuit 122 is directed through low pass filter 124 (FIG. 13B), containing a resistor 140 and a capacitor 140A, to the negative input of comparator 125. Sample, hold and scale circuit 123 contains a capacitor 141 which detects the peak of the signal from peak and hold circuit 122 and discharges through a resistor 142 to ground. Also included are a Schottky diode 146 and operational amplifiers 147 and 148. The voltage across capacitor 141 is passed through operational amplifier 148, which performs as a follower, to the combination of resistors 143 and 144, which provide a scaling factor. The output of sample, hold and scale circuit 123 is directed to the positive input of comparator 125.

The values of capacitor 139 and resistor 139A (in peak and hold circuit 122) and capacitor 141 and resistor 142 (in sample, hold and scale circuit 123) are set at values relative to each other such that the output of peak and hold circuit 122 decays faster than the output of sample, hold and scale circuit 123. In the preferred embodiment, the values of these components are set as follows: capacitor 139: 0.001 F; resistor 140: 15 KΩ; capacitor 141: 0.1 F; resistor 142: 680 KΩ.

Figure 14A:
FIGS. 14A-14G illustrate waveforms at various points in the burst detection unit.
Figure 14B:
Figure 14C:
Figure 14D:
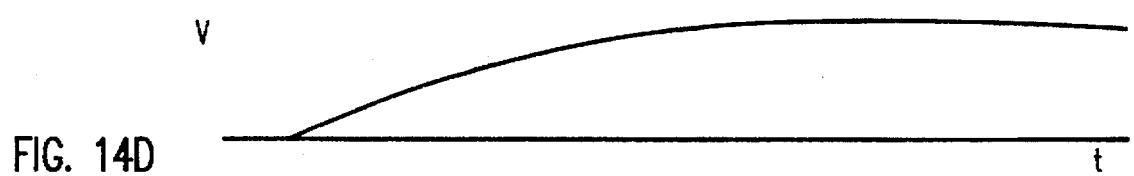
Figure 14E:
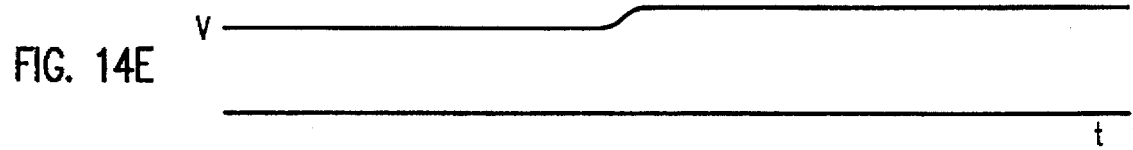
Figure 14F:
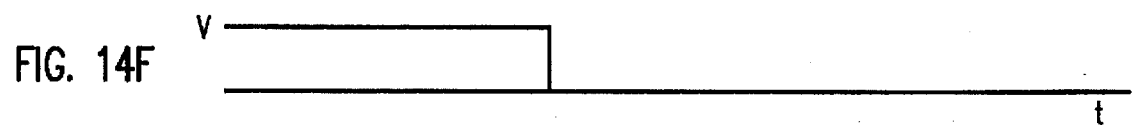
Figure 14G:
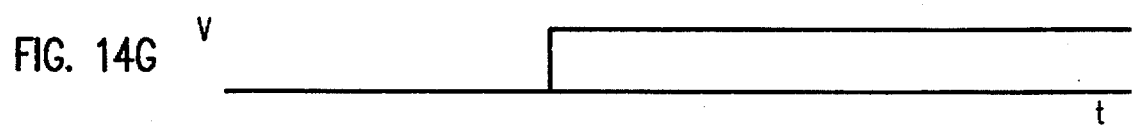

FIGS. 14A–14G illustrate a view of a burst as it proceeds through this circuitry. Each of FIGS. 14A–14G represents the waveform at the position designated in FIG. 12. Thus FIG. 14A represents the waveform at the input of amplifier 120; FIG. 14B represents the waveform at the output of full-wave rectifier 121; FIG. 14C represents the waveform at the output of peak and hold circuit 122; FIG. 14D represents the waveform at the output of low-pass filter 124; FIG. 14E represents the waveform at the output of sample, hold and scale circuit 123; FIG. 14F represents the waveform at the output of comparator 125; and FIG. 14G represents the waveform at the output of inverter 126.

The output from one of the detectors 1–4 (FIG. 14A) is amplified by amplifier 120 and fed into full-wave rectifier 121. The output of full-wave rectifier 121 (FIG. 14B) is fed into peak and hold circuit 122, which turns the rectified output into a stair step type waveform (FIG. 14C). Low-pass filter 124 turns the stair step into a ramp (FIG. 14D) which approximates the time-delayed envelope of the rectified peak amplitude. The time delay introduced by low-pass filter 124 represents an absolute error but not a relative error, since the delay remains approximately the same from burst to burst. The trigger point is reached when the output of low-pass filter 124 (FIG. 14D) reaches the scaled peak value from the previous cycle, which is being held by sample, hold and scale circuit 123. As is indicated in FIG. 14E, the voltage decay rate of peak and hold circuit 122 is substantially greater than the decay rate of sample, hold and scale circuit 123 (FIG. 14C). The output of sample, hold and scale circuit 123 includes a voltage divider containing resistors 143 and 144, the relative values of which determine the percentage of the previous peak at which the circuit will trigger.

When the trigger point is reached, comparator 125 goes to its low output state, since the voltage at the negative input (from low-pass filter 124) exceeds the voltage at its positive input (from sample, hold and scale circuit 123). The output of comparator 125 (FIG. 14F) is then inverted in inverter 126 (FIG. 14G). The respective outputs of burst detection units 62A–62D are designated DET1–DET4 in FIG. 13B.

Detector Latches

Figure 15:
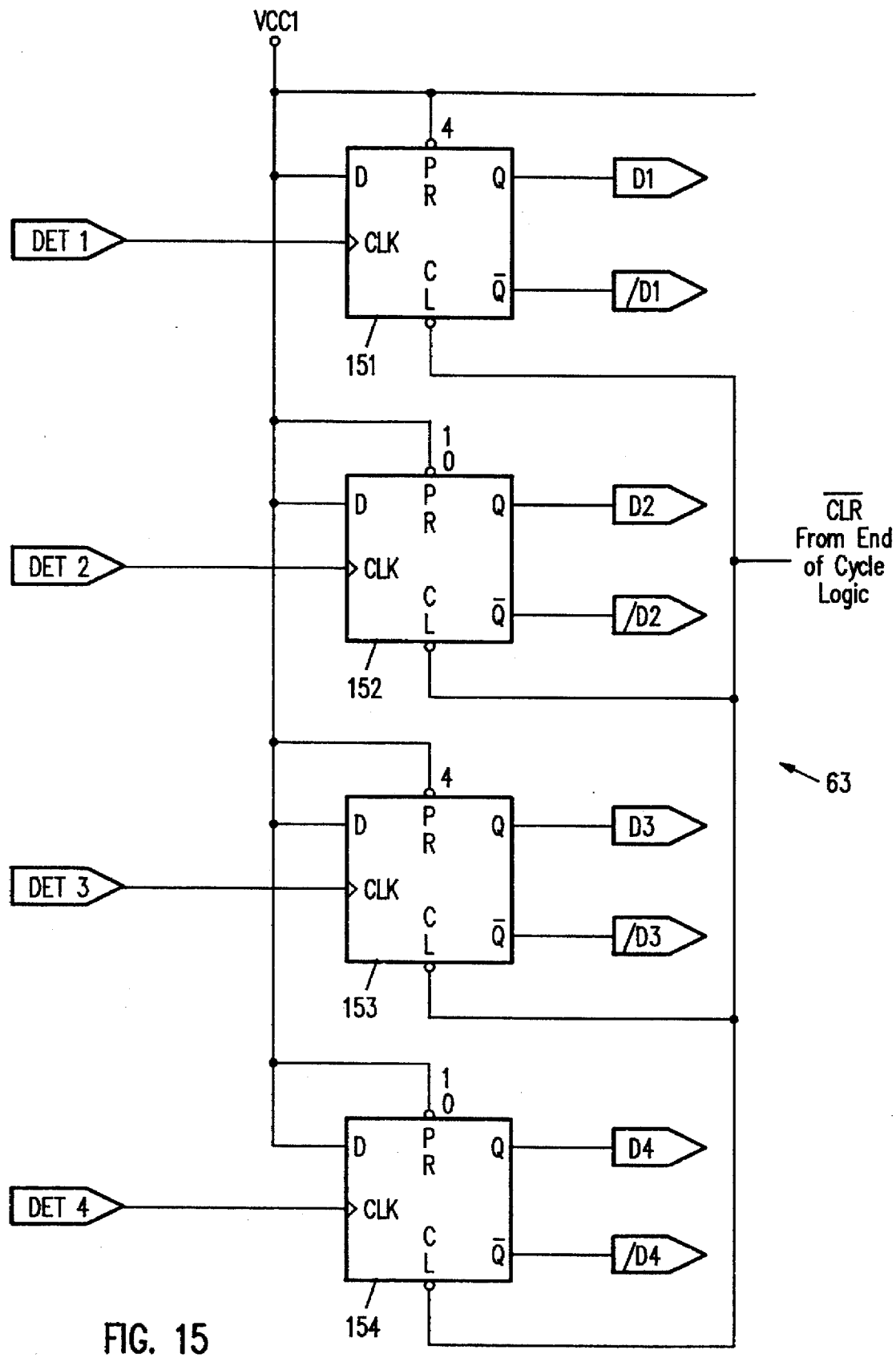
FIG. 15 illustrates a diagram of the detector latch unit.

Detector latch unit 63 holds the respective outputs of burst detection circuits 62A–62D. As shown in FIG. 15, detector latch unit 63 includes four flip-flops 151–154. Each of flip-flops 151–154 has a clock input which is connected to one of detectors 1–4 through one of the burst detection circuits 62A–62D. Each of flip-flops 151–154 has a true and an inverted output, designated D1, $\overline{D1}$; D2, $\overline{D2}$, etc., respectively. Thus when inverter 126 at the output of one of burst detection circuits 62A–62D (FIG. 12) delivers a high output, signifying the arrival of a burst, a corresponding one of flip-flops 151–154 is clocked, and remains in this state until it is reset.

Quadrant Detection and Word Generation Unit

Figure 16:
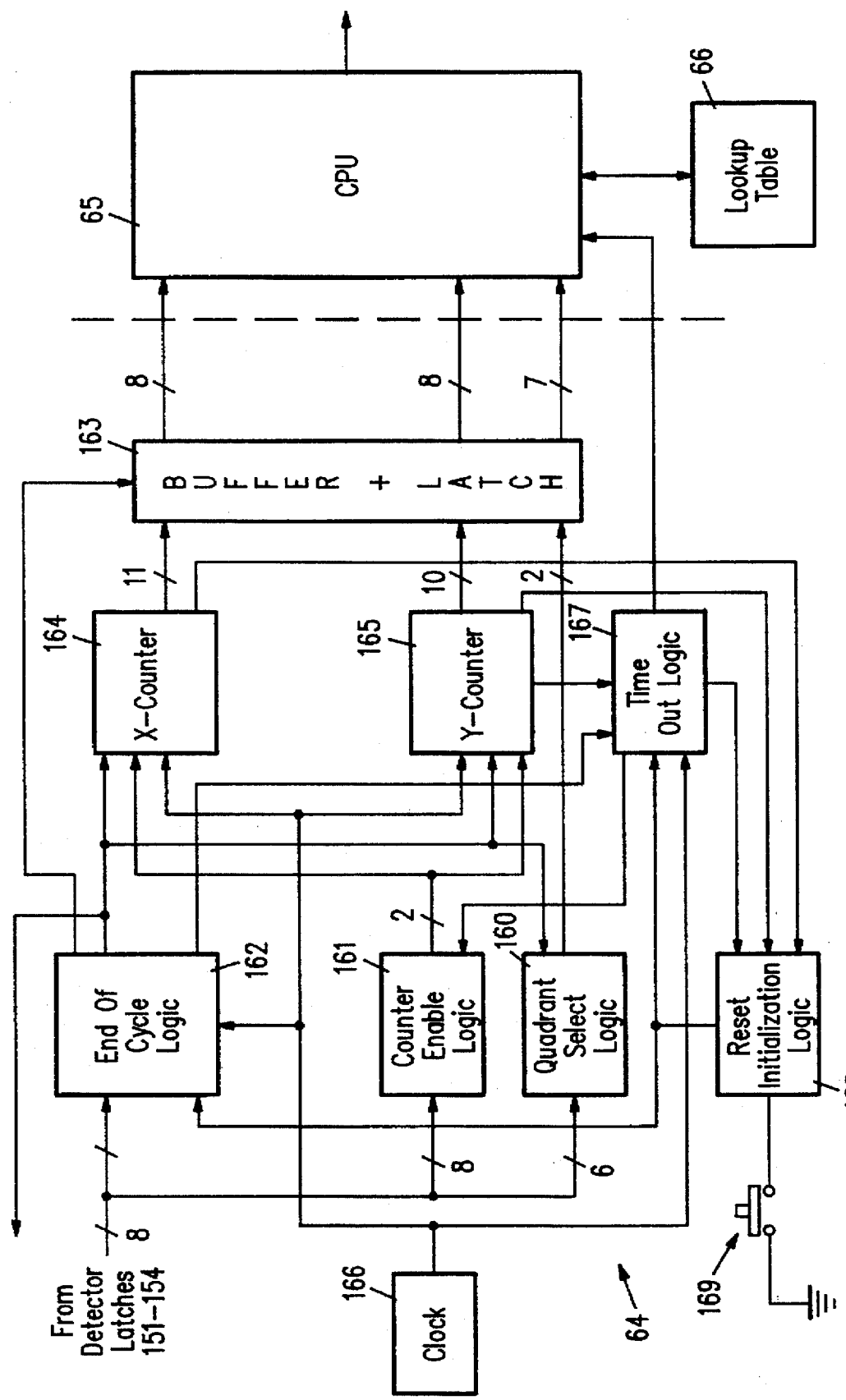
FIG. 16 illustrates a block diagram of the quadrant detection and word generation unit.

After the input signals pass through the detector latch unit 63, they enter the logic circuitry which calculates the position of stylus 60. Quadrant detection and word generation unit 64 is illustrated in FIG. 16. The outputs of detector latch unit 63 are connected to quadrant select logic 160, counter enable logic 161 and end of cycle logic 162, although to simplify the drawing only a single line is shown. The output of quadrant select logic 160 is directed through a buffer and latch unit 163 to CPU 65, while the outputs of counter enable logic 161 and end of cycle logic 162 are directed to an x-counter 164 and a y-counter 165. The outputs of x-counter 164 and y-counter 165 flow through buffer and latch unit 163 to CPU 65. End of cycle logic 162, time out logic 167, x-counter 164 and y-counter 165 are clocked at 32 MHz by a clock 166. Time out logic 167 and reset/initialization logic 168 are connected to the other components of unit 64 as shown in FIG. 16. As explained below, a manual push button switch 169 is used to reset the logic in the event of an "out of sync" condition.

A single burst from stylus 60 arrives at different times at each of detectors 1–4. The first burst identifies which of the quadrants I–IV (see FIG. 7A) stylus 60 is in, since it will reach the corresponding detector first (if stylus 60 is in quadrant I, the burst will arrive at detector 1 first, etc.). Quadrant select logic 160 identifies which detector has initially received the burst, and sends this information to CPU 65.

When a burst is initially detected at one of detectors 1–4, counter enable logic 161 triggers x-counter 164 and y-counter 165. When the burst is detected by the next detector, counter enable logic 161 determines whether that detector is on the same horizontal edge or the same vertical edge of plate 61 with the detector which first detected the burst. ("Horizontal edge" refers to an edge parallel to the x-axis; "vertical edge" refers to an edge parallel to the y-axis.) If it is on the same horizontal edge, counter enable logic 161 disables x-counter 164. If it is on the same vertical edge, counter enable logic 161 disables y-counter 165. When the burst is detected by the third detector, counter enable logic 161 disables whichever of x-counter 164 and y-counter 165 is still counting. When the burst is detected at the fourth detector, end of cycle logic 162 resets counters 164 and 165, and resets the flip-flops 151–154 in detector latch unit 63 (FIG. 15).

The values stored in x-counter 164 and y-counter 165 represent the difference in time that it takes the burst to arrive at detectors that are positioned along a horizontal edge and a vertical edge, respectively, of plate 61. Since the burst travels through plate 61 at a uniform speed in all directions, these time differences in turn correspond to differences in the length of vectors between the point at which the stylus is located and these detectors.

For example, if stylus 60 is positioned as shown in FIG. 7A, a burst is initially detected by detector 1. Quadrant select logic 160 detects this fact and so informs CPU 65. This places stylus 60 somewhere in quadrant I.

At the same time the burst is detected by detector 1, counter enable logic 161 instructs counters 164 and 165 to begin counting. The burst will next be detected at detector 3, and when this happens counter enable logic 161 recognizes that detectors 1 and 3 are positioned along a vertical edge of plate 61 and instructs y-counter 165 to stop counting. The binary word in y-counter 165 thus represents the elapsed time between the arrival of the pulse at detector 1 and its arrival at detector 3, and this in turn represents the difference in the lengths of vectors $r_3$ and $r_1$ ($r_3-r_1$) in FIG. 7A.

The third detector to receive the pulse will be detector 4. Counter enable logic 161 then disables x-counter 164. The binary word stored in x-counter 164 represents the elapsed time between the arrival of the pulse at detector 1 and its arrival at detector 4. This in turn represents the difference in the lengths of vectors $r_4$ and $r_1$ ($r_4-r_1$) in FIG. 7.

The fourth detector to receive the pulse is detector 2. This signifies the end of the cycle, and when this happens the CTOL logic 301 provides a clock to gate the contents of counters 164 and 165 into their associated latch memories 181 and 182, and the contents of the quadrant select logic into its associated latch memory 183 (see FIG. 18A). The end of cycle logic 162 then resets counters 164 and 165 to zero and flip-flops 151–154 to their normal state.

A more detailed description of the mathematics used to determine the location of stylus 60 is given below. It may be noted here, however, that the number stored in x-counter 164, which represents $r_4-r_1$, defines a hyperbola having detectors 1 and 4 as its foci. Similarly, the binary word stored in y-counter 165, which represents $r_3-r_1$, defines a hyperbola having detectors 1 and 3 as its foci. The location of stylus 60 is defined at the intersection of these two hyperbolas. FIG. 18B illustrates two families of hyperbolas having detectors 1 and 3 and detectors 1 and 4, respectively, as their foci.

Figure 17A:
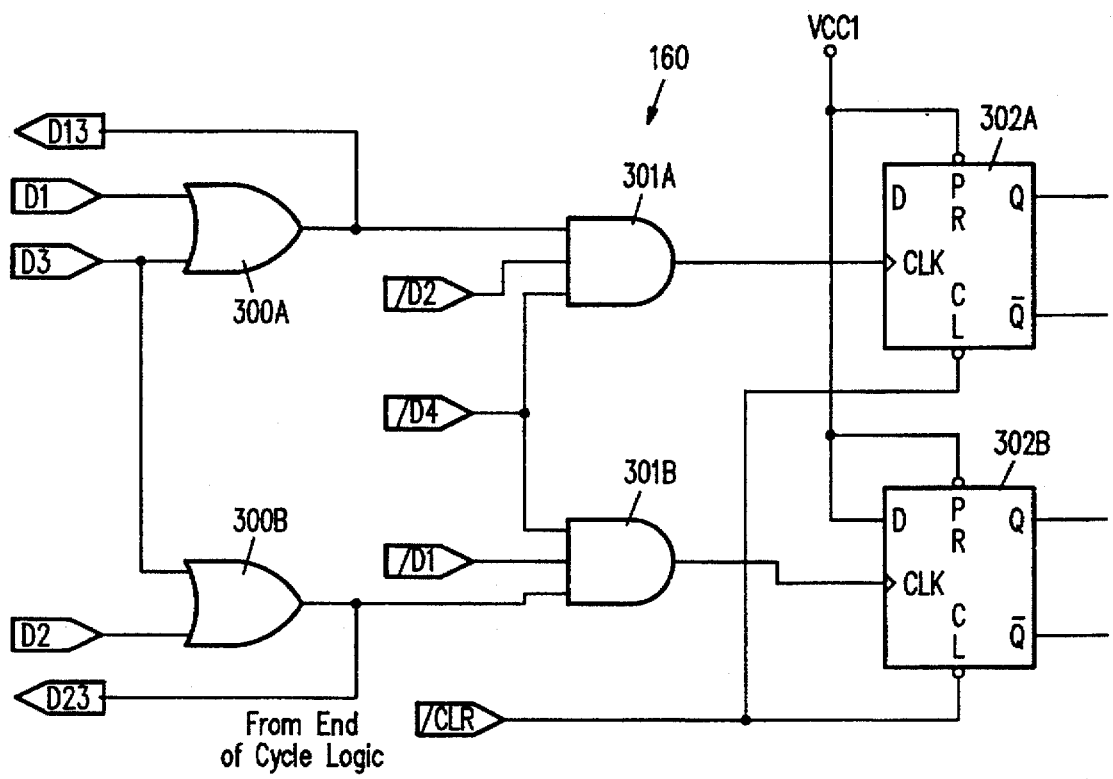
FIG. 17A illustrates a diagram of the quadrant selection logic.

FIG. 17A illustrates an embodiment of quadrant select logic 160. A pair of OR gates 300A and 300B have their inputs connected to the outputs D1, D2 and D3 from detector latches 151–154. The outputs of OR gates 300A and 300B flow to inputs of AND gates 301A and 301B as shown. Other inputs of AND gates 301A and 301B are connected to outputs $\overline{D1}$, $\overline{D2}$ and $\overline{D4}$ from detector latches 151–154. The outputs of AND gates 301A and 301B are directed to the clock inputs of flip-flops 302A and 302B. Each of flip-flops 302A and 302B has a true output Q and an inverse output $\overline{Q}$.

Before a pulse arrives at detectors 1–4, each of the outputs D1–D4 is low and each of the outputs $\overline{D1}$–$\overline{D4}$ is high. Each of the outputs Q of flip-flops 302A and 302B is low and each of the outputs $\overline{Q}$ is high. As explained below, this represents a binary zero output from flip-flops 302A and 302B.

To understand the operation of this circuit, assume that the pulse arrives at detector 1 first (FIG. 7A). Output D1 therefore goes high and output $\overline{D1}$ goes low. Therefore, OR gate 300A and AND gate 301A will have high outputs, and the clock input of flip-flop 302A will be pulsed. On the other hand, the outputs of OR gate 300B and AND gate 301B remain low. Thus, flip-flop 302A has a binary one output (Q is high) and flip-flop 302B has a binary zero output. This 2-bit binary word 10 is delivered to buffer and latch unit 163, and indicates that stylus 60 is in quadrant I.

Similarly, if stylus 60 is in one of quadrants II–IV, quadrant select logic 160 will output a 2-bit binary word identifying the quadrant. The following table shows the binary word representing each of the quadrants.

| Quadrant of Initial Burst Arrival | Binary Output of Quadrant Select Logic |
|---|---|
| I | 1 0 |
| II | 0 1 |
| III | 1 1 |
| IV | 0 0 |

Thus, buffer and latch unit 163 (FIG. 16) receives a 2-bit binary word indicating the quadrant in which the stylus is positioned and transfers this information to CPU 65.

Figure 17C:
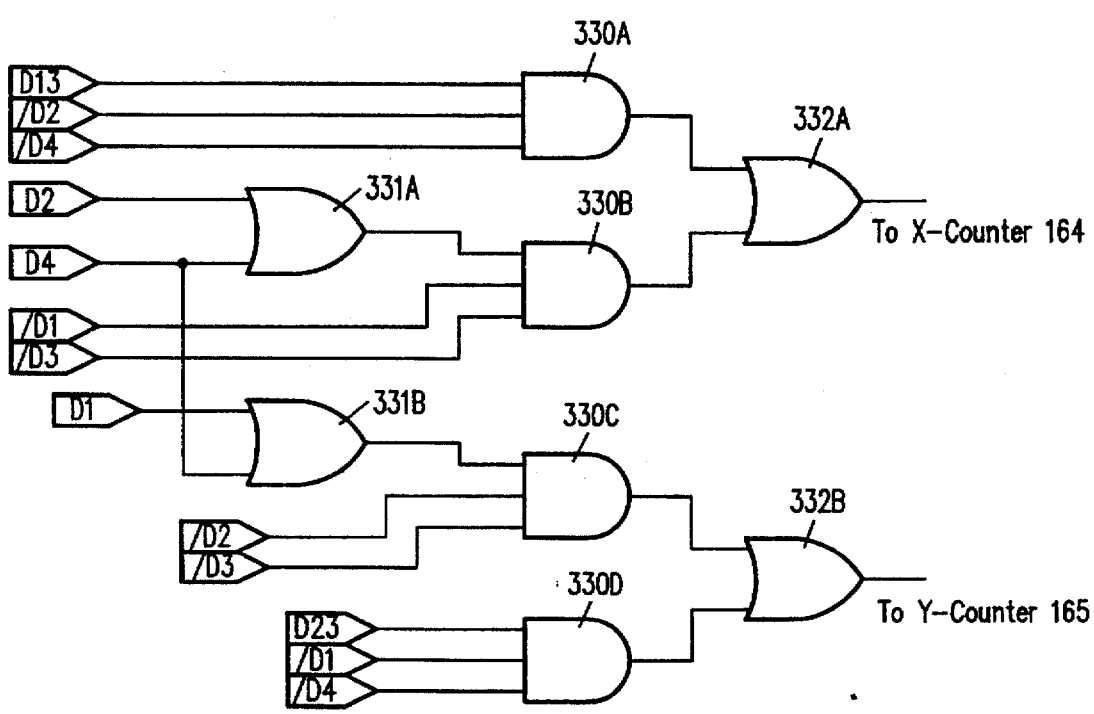
FIG. 17C illustrates a diagram of an improved embodiment of the counter enable logic.
Figure 17B:
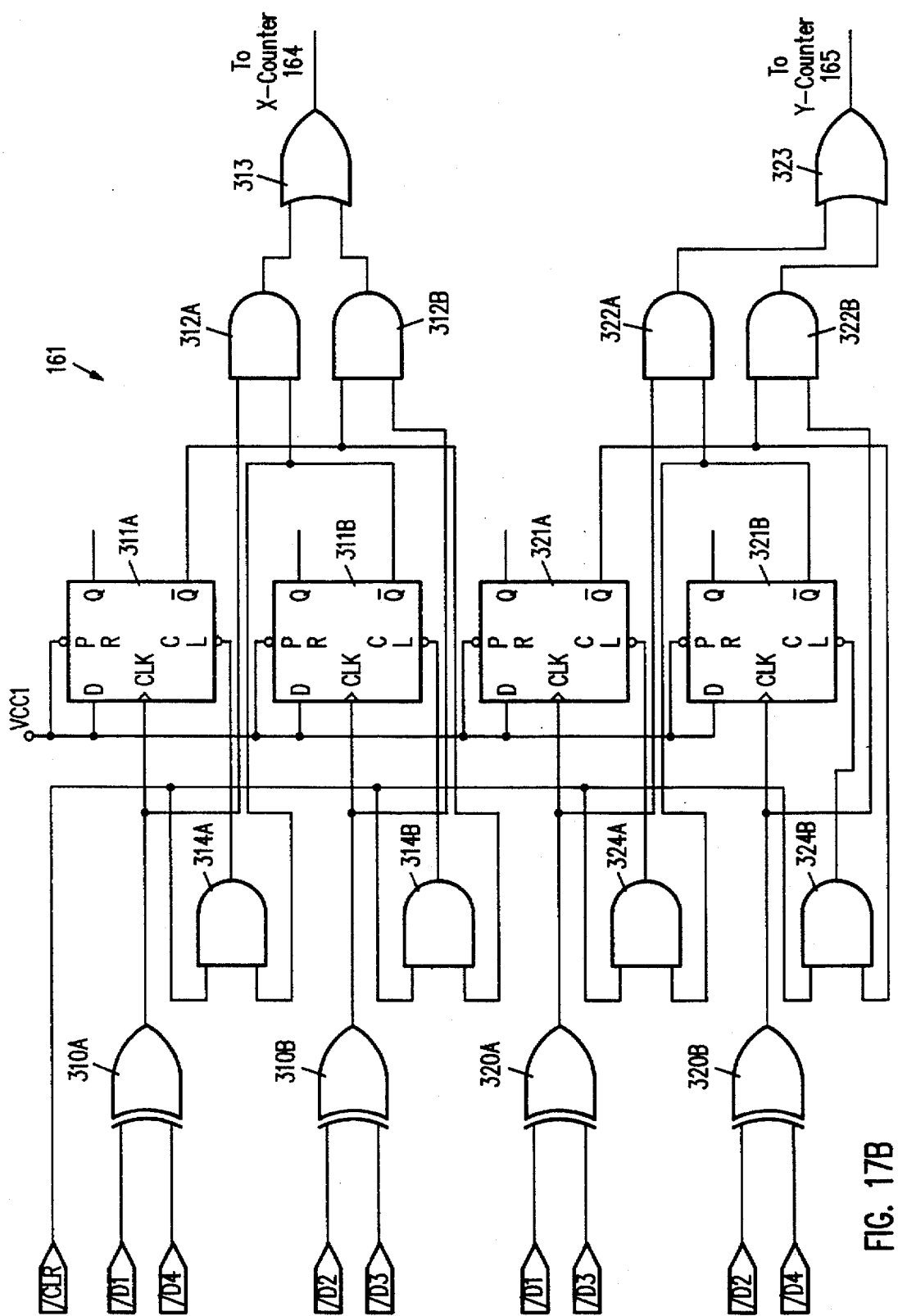
FIG. 17B illustrates a diagram of one embodiment of the counter enable logic.

FIG. 17B illustrates an embodiment of counter enable logic 161, which has two outputs directed to x-counter 164 and y-counter 165, respectively. The circuitry associated with each of these outputs is similar and will be described separately, beginning with the circuitry associated with x-counter 164.

Four inputs $\overline{D1}$–$\overline{D4}$ are connected to the inputs to exclusive OR gates 310A and 310B, as shown in FIG. 17B. An output of exclusive OR gate 310A goes to the clock input of a flip-flop 311A and an input of an AND gate 312A. The output of exclusive OR gate 310B is connected to the clock input of a flip-flop 311B and to an input of an AND gate 312B. An inverse output ($\overline{Q}$) of flip-flop 311A is connected to the other input of AND gate 312B, and the inverse output ($\overline{Q}$) of flip-flop 311B is connected to the other input of AND gate 312A. The outputs of AND gates 312A and 312B are connected to the inputs of an OR gate 313. The inverse output ($\overline{Q}$) of flip-flop 311A is also connected to an input of AND gate 314B. The inverse output ($\overline{Q}$) of flip-flop 311B is also connected to an input of an AND gate 314A. The outputs of AND gates 314A and 314B are connected to clear inputs of flip-flops 311A and 311B, respectively.

If, as shown in FIG. 7A, the stylus is located in quadrant I, the pulse arrives first at detector 1. Input $\overline{D1}$ therefore goes low first, and the output of exclusive OR gate 310A goes to a binary one. This clocks flip-flop 311A and causes the outputs of AND gate 312A and OR gate 313 to go to a binary one. The binary one at the output of OR gate 313 enables x-counter 164.

At the same time, the inverse output ($\overline{Q}$) of flip-flop 311A becomes a binary zero, disabling AND gates 312B and 314B so that the inputs $\overline{D2}$ and $\overline{D3}$ cannot affect the operation of x-counter 164. Thus, x-counter 164 continues to count as the burst arrives at detectors 2 and 3. When the burst arrives at detector 4, the output of exclusive OR gate 310A goes to a binary zero. The outputs of AND gate 312A and OR gate 313 also go to a zero, ending the enable signal to x-counter 164. Thus, x-counter 164 continues to count between the arrival of the burst at detector 1 and detector 4, and when it has been disabled it therefore contains a digital representation of the difference in the respective length of vectors $r_1$ and $r_4$ in FIG. 7A.

The other half of counter enable logic 161 operates in a similar manner to control y-counter 165. When the pulse arrives at detector 1, the output of an exclusive OR gate 320A goes to a binary one causing the output of an OR gate 323 to enable y-counter 165. At the same time a flip-flop 321A is clocked, and its inverse output ($\overline{Q}$) becomes a binary zero, disabling AND gates 322B and 324B so that the inputs $\overline{D2}$ and $\overline{D4}$ cannot affect the operation of y-counter 165. When the pulse arrives at detector 3, the output of exclusive OR gate 320A goes to a binary zero, causing the outputs of AND gate 322A and OR gate 323 to become a binary zero and disabling y-counter 165. Y-counter 165 therefore contains a digital representation of the time difference in the arrival of the burst at detectors 1 and 3. As is evident from FIG. 7A, this in turn represents the difference in the lengths of vectors $r_3$ and $r_1$.

With the embodiment of counter enable logic 161 shown in FIG. 17B, each detector is "paired" with another detector, depending on where the burst arrives first. For example, in the embodiment described above, detectors 1 and 4 are paired to control the operation of x-counter 164, because the burst is received first at detector 1.

This arrangement can create problems when the stylus crosses an axis separating two of the quadrants. So long as stylus 60 is in quadrant I, the pulse is first sensed by detector 1. Detector 1 generates a signal which starts both x-counter 164 and y-counter 165 running. As stylus 60 moves across the axis between quadrant I and quadrant III, however, detector 3 should take over from detector 1 to start the counters running, and detector 2 should take over from detector 4 to stop x-counter 164. However, owing to slight misalignment of the detectors or timing variations in the burst detection units, either of the following may happen: (i) detector 2 may start to disable x-counter 164 before detector 1 hands over the starting function to detector 3; or (ii) detector 4 may continue to stop the running of x-counter 164 for a short time after detector 1 hands over the starting function to detector 3. In either case, the result is an offset in the output of the digitizer as stylus 60 crosses from quadrant I to quadrant III.

This problem is alleviated somewhat in the alternative embodiment of counter enable logic 161 shown in FIG. 17C. Inputs D1–D4 and $\overline{D1}$–$\overline{D4}$ are connected to the inputs of AND gates 330A–330D and OR gates 331A–331B. The input designated "D13" refers to an input that goes high when the burst is received at either detector 1 or detector 3; similarly, the input designated "D23" refers to an input that goes high when the pulse is received at either detector 2 or detector 3. As shown in FIG. 17A, these inputs can be taken at the outputs of OR gates 300A and 300B, respectively. The outputs of AND gates 330A and 330B feed the inputs of an OR gate 332A, and the outputs of AND gates 330C and 330D feed the inputs of an OR gate 332B. The output of OR gate 332A goes to x-counter 164, and the output of OR gate 332B goes to y-counter 165.

Initially, inputs $\overline{D1}$–$\overline{D4}$ are high, and the circuit is waiting for a high signal from one of inputs D1–D4 at the inputs to AND gates 330A–330D. If stylus 60 is in quadrant I, input D1 goes high and AND gates 330A and 330C deliver a binary one output. The outputs of OR gates 332A and 332B therefore enable x-counter 164 and y-counter 165, respectively. At the same time, input $\overline{D1}$ goes low, disabling AND gates 330B and 330D.

When the burst arrives at either detector 2 or detector 4, $\overline{D2}$ or $\overline{D4}$ goes low, disabling AND gate 330A and stopping x-counter 164. When the burst arrives at detector 2 or detector 3, input $\overline{D2}$ or $\overline{D3}$ goes low, disabling AND gate 330C and stopping y-counter 165. Thus, when the stylus is in either quadrant I or quadrant III, x-counter 164 is stopped by the arrival of the burst at either detector 2 or 4; when the stylus is in quadrant II or quadrant IV, x-counter 164 is stopped by the arrival of the burst at either detector 1 or detector 3. Y-counter 165 is controlled in the same manner. When the stylus is in quadrant I or IV, y-counter 165 is stopped by the arrival of the burst at either detector 2 or detector 3; when the stylus is in quadrant II or III, y-counter 165 is stopped by the arrival of the burst at either detector 1 or detector 4. This has the effect of smoothing out any offset that may occur when the stylus crosses an axis between two of the quadrants.

Figure 18A:
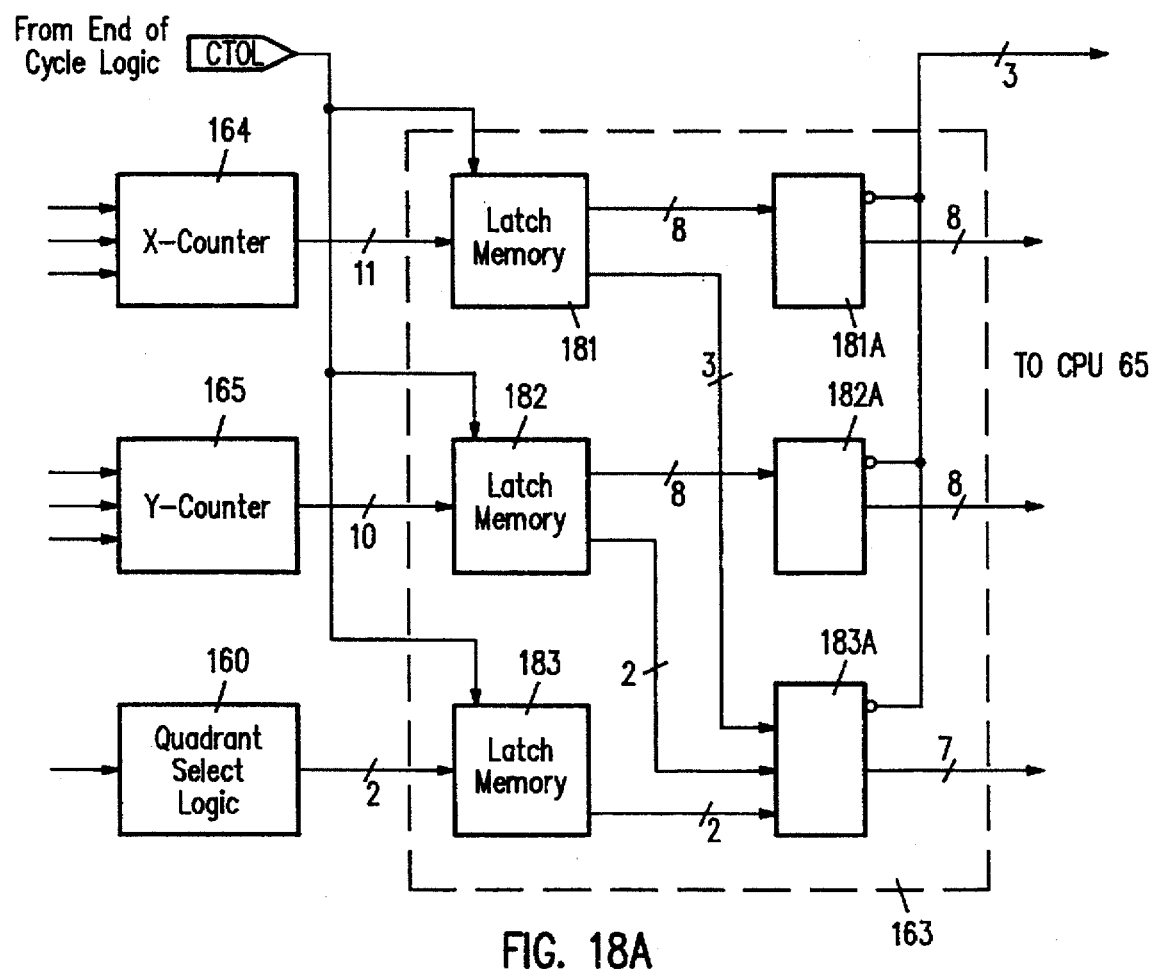
FIG. 18A illustrates a diagram of the buffer and latch unit.
Figure 18B:
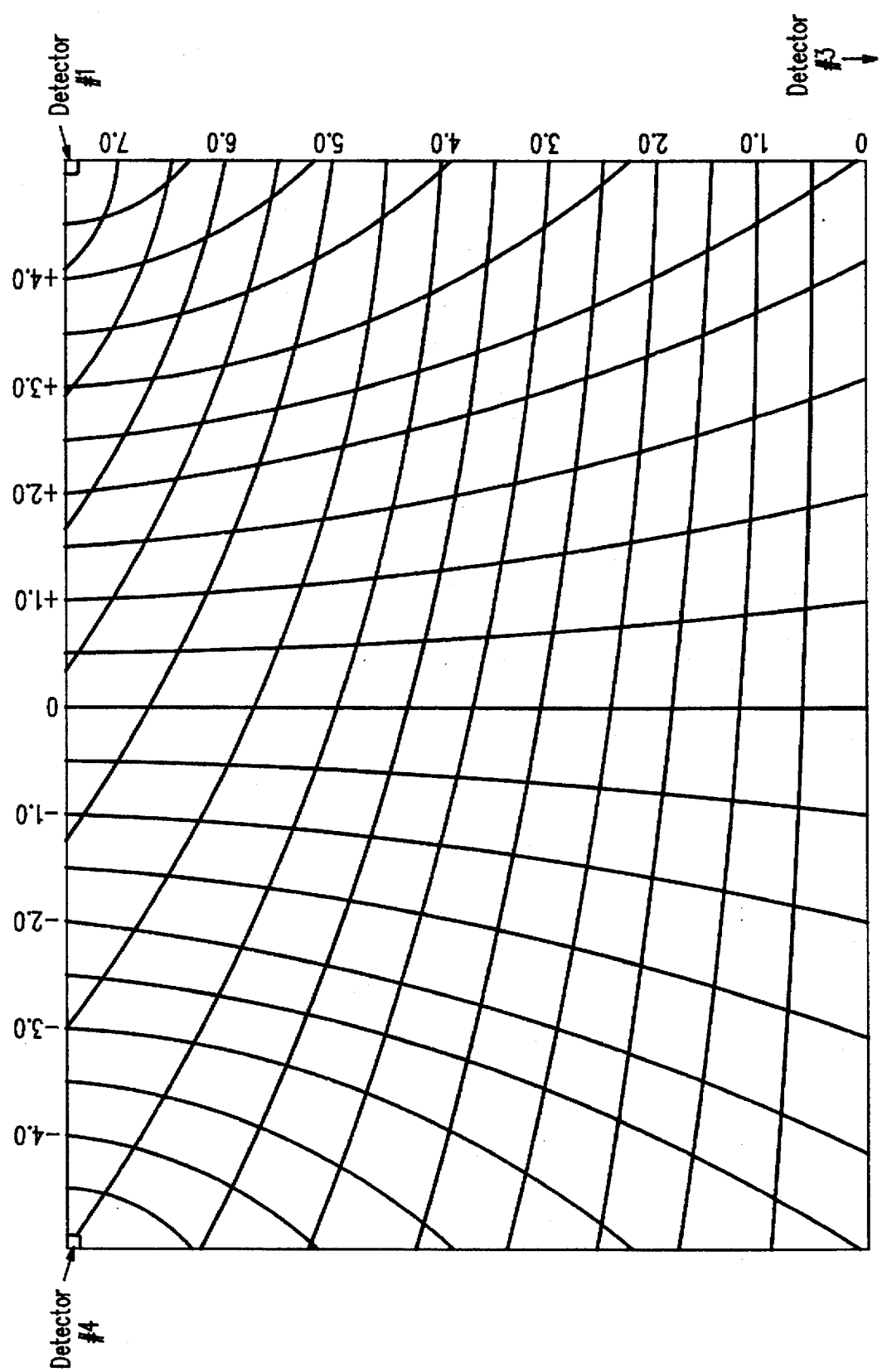
FIG. 18B illustrates two families of hyperbolas defined by the values in the counters.

FIG. 18A illustrates a block diagram of buffer and latch unit 163. X-counter 164 delivers an 11-bit word to a latch memory 181, and y-counter 165 delivers a 10-bit word to a latch memory 182. Assuming that the $A_o$ wave propagates through plate 61 at a velocity of 3,310 meters/sec., it takes the wave about 60.6 μsec to traverse the 7.9 inch width of plate 61. At the 32 MHz clock rate, this equates to approximately 2000 counts. This represents the maximum difference in the arrival time of the burst at a horizontal pair of detectors (i.e., detectors 1 and 4 or detectors 2 and 3). Thus an 11-bit word (decimal 2048) is adequate to represent any word which could appear in x-counter 164. Similarly, a 10-bit word (decimal 1028) is adequate to represent the maximum time difference between the arrival of the burst at the vertical detector pairs (detectors 1 and 3 or detectors 2 and 4). As mentioned above, a 2-bit word is used to specify the quadrant in which the stylus is located. This 2-bit word is delivered to a latch memory 183.

A set of three 8-bit buffers 181A, 182A and 183A pass these binary words to CPU 65. An 8-bit segment from the word in latch memory 181 passes through buffer 181A; an 8-bit segment from the word in latch memory 182 passes through buffer 182A; the remaining three bits from the word in latch memory 181 and the remaining 2 bits of the word in latch memory 182, together with the 2-bit word in latch memory 183, pass through buffer 183A.

Figure 17D:
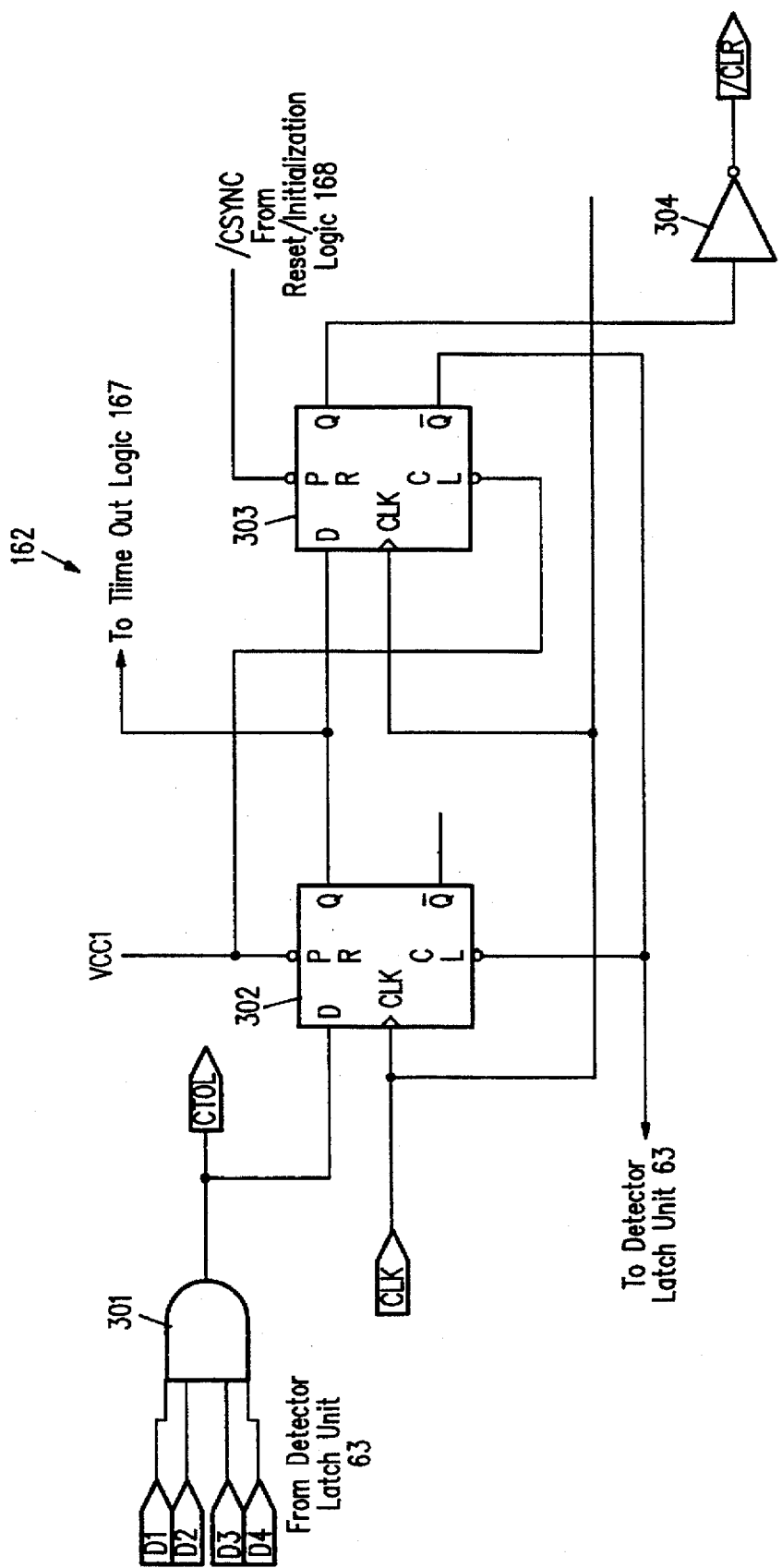
FIG. 17D illustrates a diagram of the end of cycle logic.

FIG. 17D illustrates a diagram of end of cycle logic 162. The outputs D1–D4 of detector latch unit 63 are delivered to the inputs of an AND gate 301. The completion of a cycle is indicated by the receipt of a single wave at all four detectors 1–4, and this in turn causes all of outputs D1–D4 to go high, and a high output is delivered by gate 301. This output, designated CTOL, is delivered to latch memories 181–183 (FIG. 18A) and causes the contents of x-counter 164, y-counter 165 and quadrant select logic 160 to be latched into latch memories 181–183. The output CTOL of AND gate 301 is also used to set a flip-flop 302, the output of which is delivered to time out logic 167 (FIG. 17E), the operation of which is described below. Flip-flop 302 in turn sets a flip-flop 303, the output of which, after inversion in a gate 304, becomes a clear signal (represented as $\overline{CLR}$). The $\overline{CLR}$ signal, both from the low output of flip-flop 303 and from gate 304, is used to clear x-counter 164, y-counter 165, flip-flops 151–154 in detector latch unit 63 (FIG. 15), and flip-flops 302A and 302B in quadrant select logic 160 (FIG. 17A). The $\overline{CLR}$ signal is also used to clear flip-flop 302, which in turn resets flip-flop 303 (and the $\overline{CLR}$ signal itself) at the next 32 MHz clock pulse. In summary, end of cycle logic 162 causes the contents of the x- and y-counters to be gated into their associated latch memories and then causes the counters to be synchronously cleared.

Figure 17E:
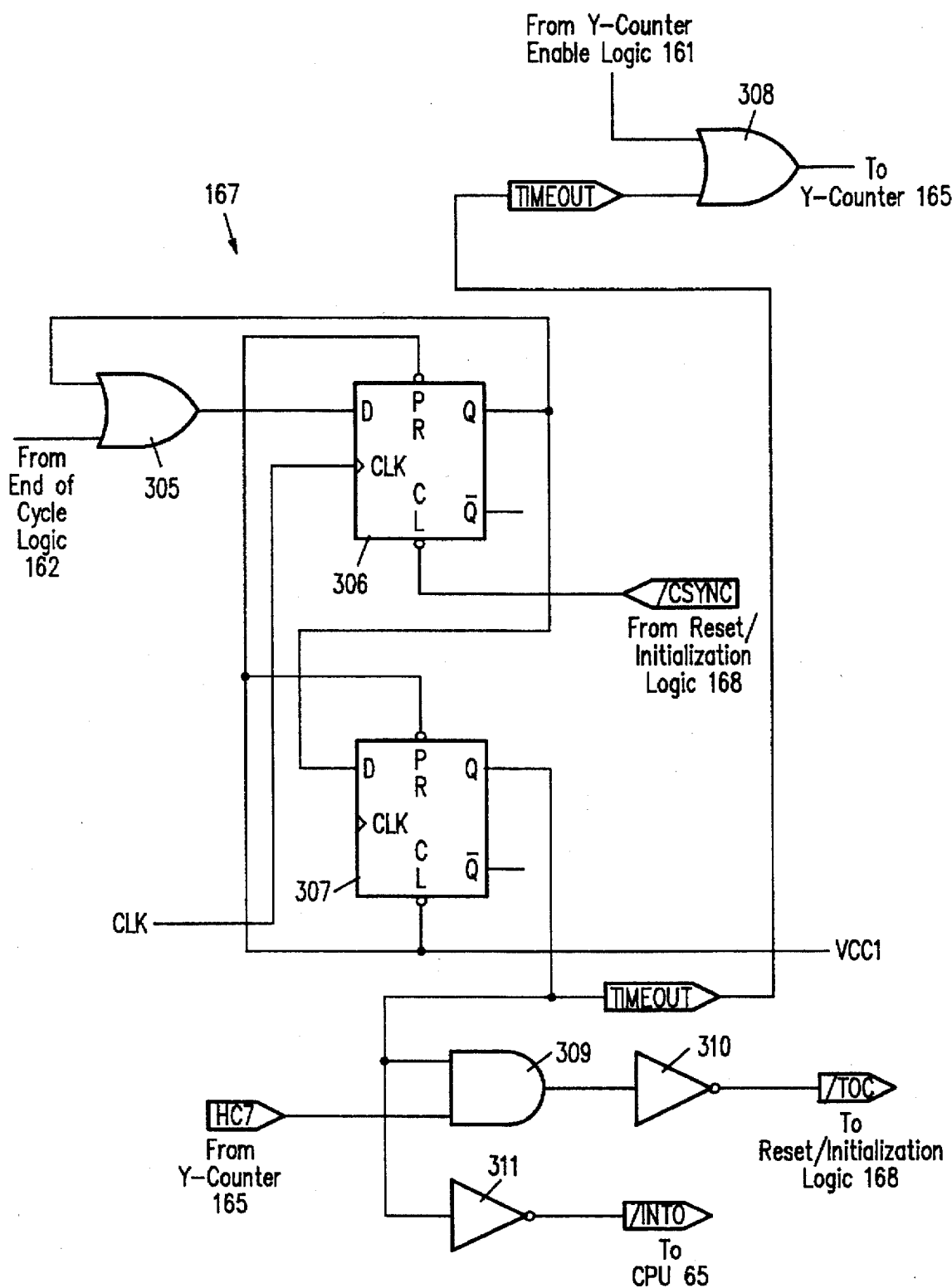
FIG. 17E illustrates a diagram of the time out logic.

FIG. 17E illustrates a diagram of time out logic 167. Time out logic 167 is triggered by a signal from the Q output of flip-flop 302 in end of cycle logic 162. This signal is passed through an OR gate 305 and sets a flip-flop 306, which in turn sets a flip-flop 307. Both flip-flops 306 and 307 are clocked at 32 MHz. Once flip-flop 306 is set, it will remain set because of a feedback path from the Q output of flip-flop 306 back to an input of OR gate 305. This feedback path keeps flip-flop 306 set for the duration of the time out sequence.

The output of flip-flop 307, designated TIMEOUT, is passed through an OR gate 308 and used to enable y-counter 165. The TIMEOUT signal is also delivered to in input of an AND gate 309. The other input of AND gate 309 is coupled to the seventh stage output of y-counter 165. Thus, after the TIMEOUT signal is asserted, AND gate 309 delivers a high output when y-counter 165 has counted to its seventh stage (64 counts). At a clock rate of 32 MHz, this takes 2 μsec. AND gate 309 therefore delivers a high output 2 μsec after the assertion of the TIMEOUT signal and, after inversion in a gate 310, this signal (designated $\overline{TOC}$ for "Time Out Complete") is delivered to reset/initialization logic 168. The TIMEOUT signal is also passed through a gate 311, after which it is used as an interrupt signal ($\overline{INTO}$) for CPU 65.

Figure 17F:
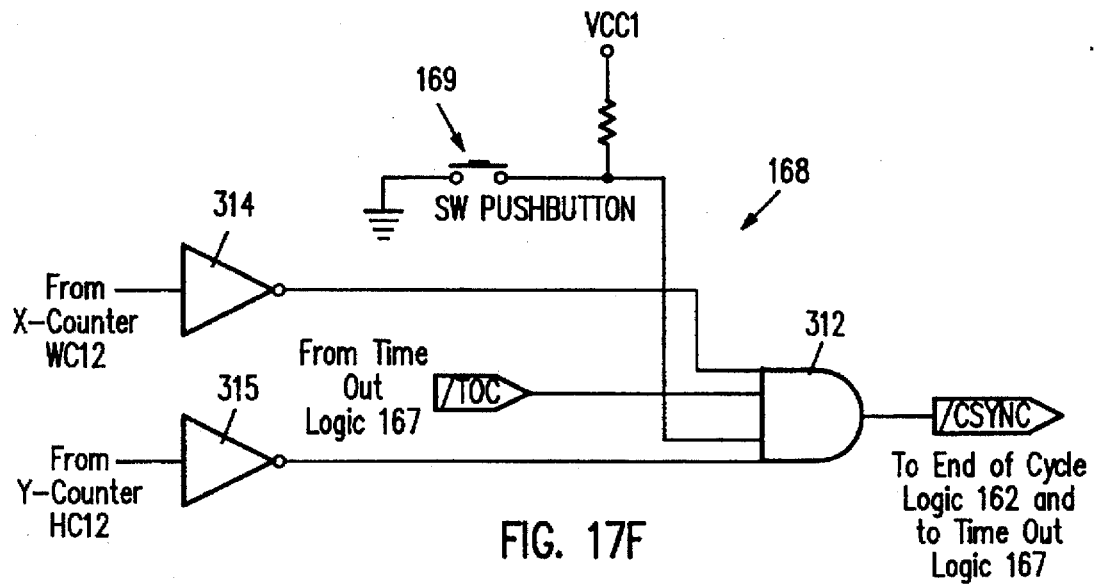
FIG. 17F illustrates a diagram of the reset/initialization logic.

FIG. 17F illustrates a diagram of reset/initialization logic 168, which consists primarily of an AND gate 312. AND gate 312 has four inputs. One input delivers the $\overline{TOC}$ signal from time out logic 167. Another input is connected through normally open push button switch 169 to ground. The final two inputs are connected to the twelfth stages of x-counter 164 and y-counter 165, respectively, which are passed through inverters 314 and 315. The inputs to AND gate 312 are all normally high. When any one of the inputs goes low, AND gate 312 delivers a low asserted output signal $\overline{CSYNC}$. $\overline{CSYNC}$ is connected to flip-flop 306 in time out logic 167 and flip-flop 303 in end of cycle logic 162. It provides an override reset/initialization signal which resets the logic of the digitizer. When, for example, $\overline{TOC}$ goes low, indicating that the 2 μsec time out sequence is complete, $\overline{CSYNC}$ is asserted low, and this in turn resets flip-flop 306 and time out logic 167. Similarly, $\overline{CSYNC}$ is delivered to the PR input of flip-flop 303, which causes flip-flop 303 to generate another $\overline{CLR}$ signal. This clears y-counter 165, which, as described above, has counted out the 2 μsec time out sequence. Generation of the $\overline{CLR}$ signal also causes x-counter 164 and the flip-flops 151–154 in detector latch unit 63 to be reset.

The operator of the digitizer may also manually reset the logic by depressing push button switch 169, which grounds one of the inputs to AND gate 312.

The remaining two inputs to AND gate 312 are used in the event that the digitizer becomes "out of sync". Normally, a cycle begins when one of detectors D1–D4 senses the arrival of a new burst. If the digitizer is operating in sync, the detector diagonally across the glass plate from the first detector is the last detector to receive the burst, and AND gate 301 then activates the remainder of end of cycle logic 162.

If a spurious noise burst should appear at any detector, it could be perceived as the first burst of a new cycle. This would most likely occur during the 8 msec gap between the bursts produced by stylus 50. Since the time lapse between bursts is much greater than the time lapse between the detection of a burst at the various detectors, in this situation counters 164 and 165 would cycle repeatedly rather than counting the time difference between the detection of a single burst at detectors D1–D4. This condition is detected when the twelfth stage of either of the counters is triggered and AND gate 312 then delivers a $\overline{\text{CSYNC}}$ signal. During the normal operation of the digitizer, the twelfth stage of counters 164 and 165 is not activated.

CPU and Lookup Table

Figure 19:
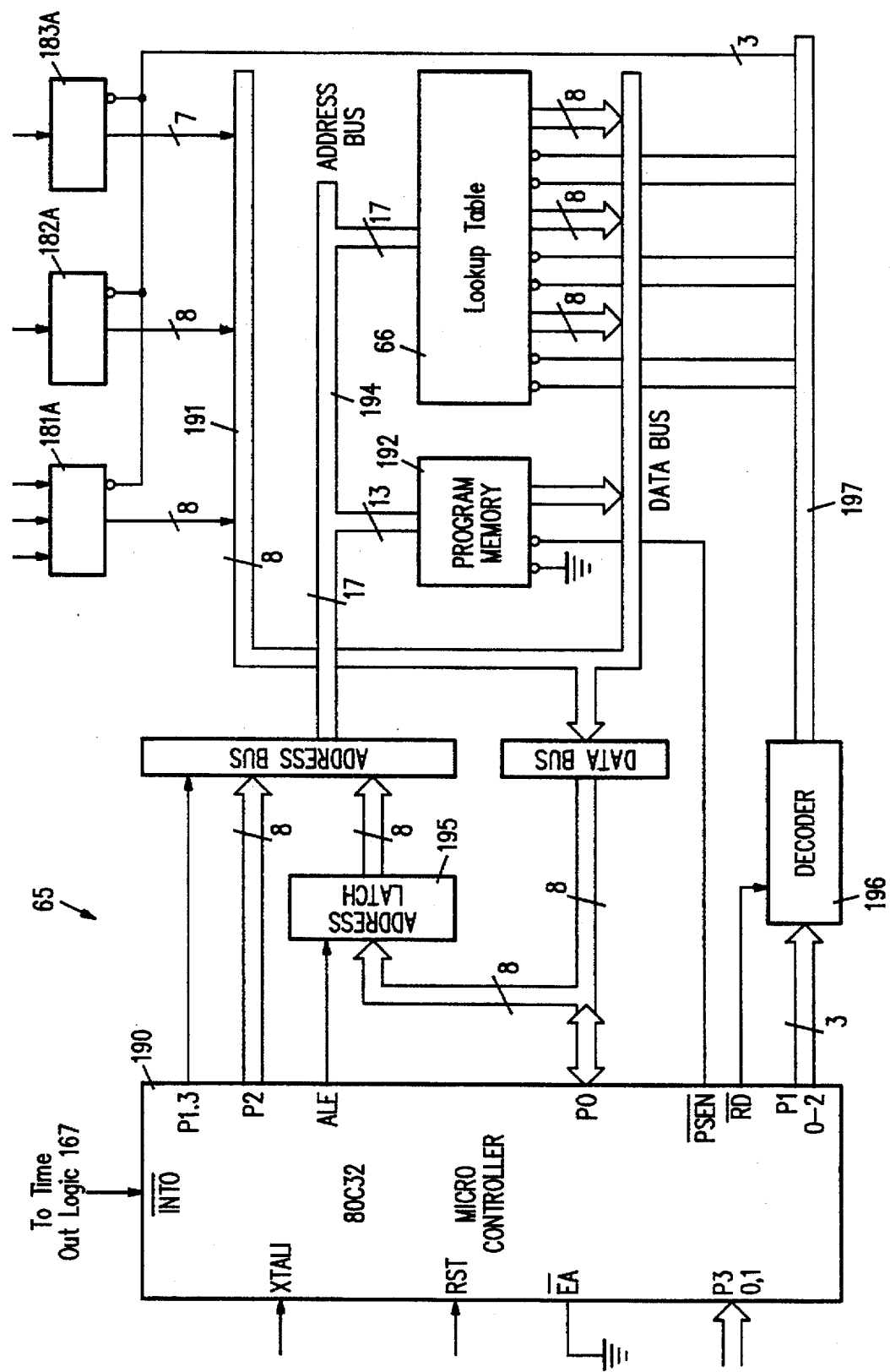
FIG. 19 illustrates a block diagram of the central processing unit and lookup table.

FIG. 19 illustrates a block diagram of CPU 65 and lookup table 66. CPU 65 includes a microcontroller 190, which in this embodiment is an Intel 80C32. The outputs of buffers 181A–183A are transmitted via a data bus 191 to an input of microcontroller 190. Another input of microcontroller 190 is connected to time out logic 167, and this input receives the $\overline{\text{INT0}}$ signal generated at the beginning of the 2 μsec time out sequence. Lookup table 66 consists of a 128K by 24 erasable programmable read only memory (EPROM). This 128K by 24 EPROM is formed by combining three 128K by 8 EPROMs. A fourth 128K by 8 EPROM serves as a program memory 192 for microcontroller 190. Lookup table 66 and program memory 192 are addressed via an address bus 194, and an address latch 195 is interposed in one segment of address bus 194. The transfer of the contents of buffers 181A–183A, lookup table 66 and program memory 192 is controlled via a decoder 196 and a data control bus 197. Microcontroller 190 is clocked with a 14.7456 MHz oscillator through its XTAL1 input.

Figure 21:
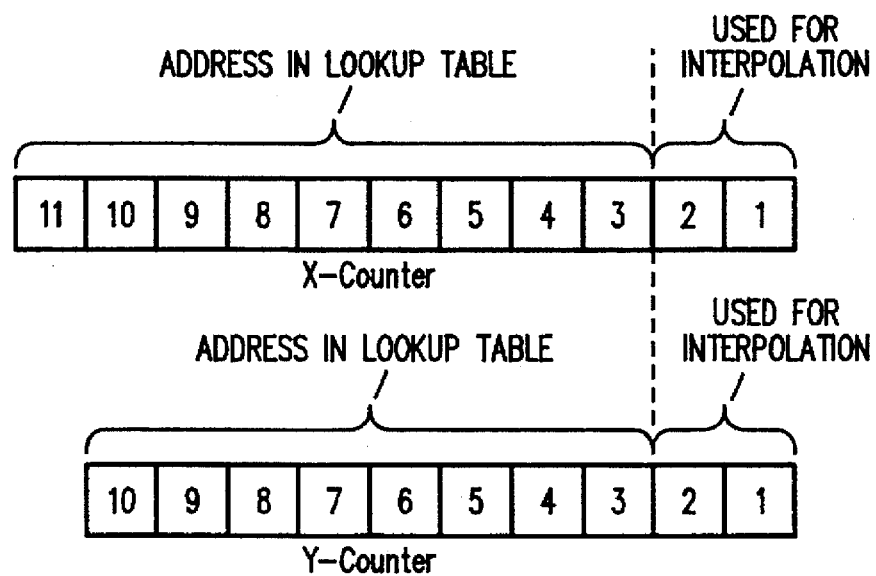
FIG. 21 illustrates schematically the words stored in the x and y counters.

As noted above, x-counter 164 generates an 11-bit word and y-counter 165 generates a 10-bit word. The word generated by x-counter 164 represents the difference in the length of vectors connecting stylus 60 with two detectors parallel to the x-axis, and the word generated by y-counter 165 represents the difference in the length of vectors connecting stylus 60 with two detectors parallel to the y-axis. These words are represented schematically in FIG. 21, with the bits numbered from the least significant bit to the most significant bit. Initially, microprocessor 190 truncates the two lowest order bits (bits 1 and 2) from each word. The remaining 9- and 8-bit words are used as addresses for lookup table 66. As noted above, each of these words defines a hyperbola having two of the detectors as its foci, and the two words together define a location on plate 61 at the intersection of the two hyperbolas. The two words also identify an address in lookup table 66 which contains the x and y coordinates of that point of intersection.

Lookup table 66 is programmed as follows. First the 32 MHz clock rate of counters 164 and 165 is converted into a distance traveled by the $A_o$ waves between clock pulses. Assuming a velocity of 3,310 meters/sec. for the $A_o$ waves, this yields about 0.004 inches (4 mils) per clock pulse. Thus the content of each counter represents a vector difference equal to 4 mils times the value of the binary word. With stylus 60 in quadrant I $$r_4 - r_1 = (0.004) \cdot (\text{value in x-counter 164}) \quad (1)$$

$$r_3 - r_1 = (0.004) \cdot (\text{value in y-counter 165}) \quad (2)$$

Since each vector difference defines a hyperbola with two of the detectors as its foci, the words in counters 164 and 165 define two equations (hyperbolas) which can be solved for a unique combination of x and y coordinates.

Referring to FIG. 7A, the following are four basic equations which show the respective lengths of the vectors in terms of the x and y coordinates and the height (H) and width (W) between the detector locations:

$$r_1^2 = \left(\frac{W}{2} - x\right)^2 + \left(\frac{H}{2} - y\right)^2 \quad (3)$$

$$r_2^2 = \left(\frac{W}{2} - x\right)^2 + \left(\frac{H}{2} - y\right)^2 \quad (4)$$

$$r_3^2 = \left(\frac{W}{2} - x\right)^2 + \left(\frac{H}{2} - y\right)^2 \quad (5)$$

$$r_4^2 = \left(\frac{W}{2} - x\right)^2 + \left(\frac{H}{2} - y\right)^2 \quad (6)$$

Since $r_3 - r_1$ and $r_4 - r_1$ are used to determine the position of stylus 60 when it is in quadrant I, the following shorthand expressions are used:

$$\Delta_{31} = r_3 - r_1 \quad (7)$$

$$\Delta_{41} = r_4 - r_1 \quad (8)$$

The objective therefore is to find expressions for x and y in terms of $\Delta_{31}$ and $\Delta_{41}$.

From the above definitions, $$r_3 = r_1 + \Delta_{31} \quad (9)$$

$$r_4 = r_1 + \Delta_{41} \quad (10)$$

Squaring these equations and rearranging terms yields:

$$r_3^2 - r_1^2 = 2r_1 \Delta_{31} + \Delta_{31}^2 \quad (11)$$

$$r_4^2 - r_1^2 = 2r_1 \Delta_{41} + \Delta_{41}^2 \quad (12)$$

Subtracting equation (3) from equation (5), substituting for the left hand side of equation (11), and rearranging terms gives:

$$2\Delta_{31} r_1 = 2Hy - \Delta_{31}^2 \quad (13)$$

Subtracting equation (3) from equation (6), substituting for the left hand side equation (12), and rearranging terms gives:

$$2\Delta_{41} r_1 = 2Wx - \Delta_{41}^2 \quad (14)$$

Dividing equation (13) by $\Delta_{31}$ and dividing equation. (14) by $\Delta_{41}$ gives:

$$2r_1 = \frac{2Hy - \Delta_{31}^2}{\Delta_{31}} = \frac{2Wx - \Delta_{41}^2}{\Delta_{41}} \quad (15)$$

Thus:

$$y = \frac{W\Delta_{31}}{H\Delta_{41}} x + \frac{\Delta_{31}}{2H} (\Delta_{31} - \Delta_{41}) \quad (16)$$

Next, equation (13) is squared, $r_1^2$ is replaced according to equation (3), and equation (16) is used to obtain an expression in x alone. After some extensive but straightforward manipulations, the resulting quadratic equation can be solved for x:

$$x = \frac{\Delta_{41}}{2} \cdot \frac{A+B^2}{(W\Delta_{31}B) + [W^2\Delta_{31}^2 B^2 + (A+B^2)(W^2H^2 - W^2\Delta_{31}^2 - H^2\Delta_{41}^2)]^{1/2}} \quad (17)$$

where $$A = H^2(W^2 - \Delta_{41}^2)$$

and $$B = H^2 + \Delta_{31}(\Delta_{41} - \Delta_{31})$$

The value of y is determined by substituting equation (17) into equation (16).

Using these equations, the appropriate x,y coordinates for each combination of the values in x-counter 164 and y-counter 165 are found. As noted above, each possible combination of bits in counters 164 and 165 (less the two least significant bits) is used as an address in lookup table 66. Each address in look-up table 66 is then programmed with the x and y coordinates which correspond to that address. For this purpose, the origin is designated to be at the center of plate 61 (see FIG. 7A).

After microcontroller 190 receives the binary words contained in counters 164 and 165, it accesses the corresponding address in lookup table 66. The two words in counters 164 and 165 (less their two least significant bits) are combined into a 17-bit word which constitutes the address. Each address location in lookup table 66 contains a 24-bit word, of which 12 bits represent the x coordinate and 12 bits represent the y coordinate. As noted above, lookup table 66 includes three 128K by 8 EPROMS. One EPROM contains the lowest 8 bits of the x coordinate, the second EPROM contains the 8 lowest bits of the y coordinate, and the third EPROM contains the upper 4 bits of each of the x and y coordinates. In the third EPROM, the upper nibble contains the upper 4 bits of the x coordinate, while the lower nibble contains the upper 4 bits of the y coordinate.

Figure 22:
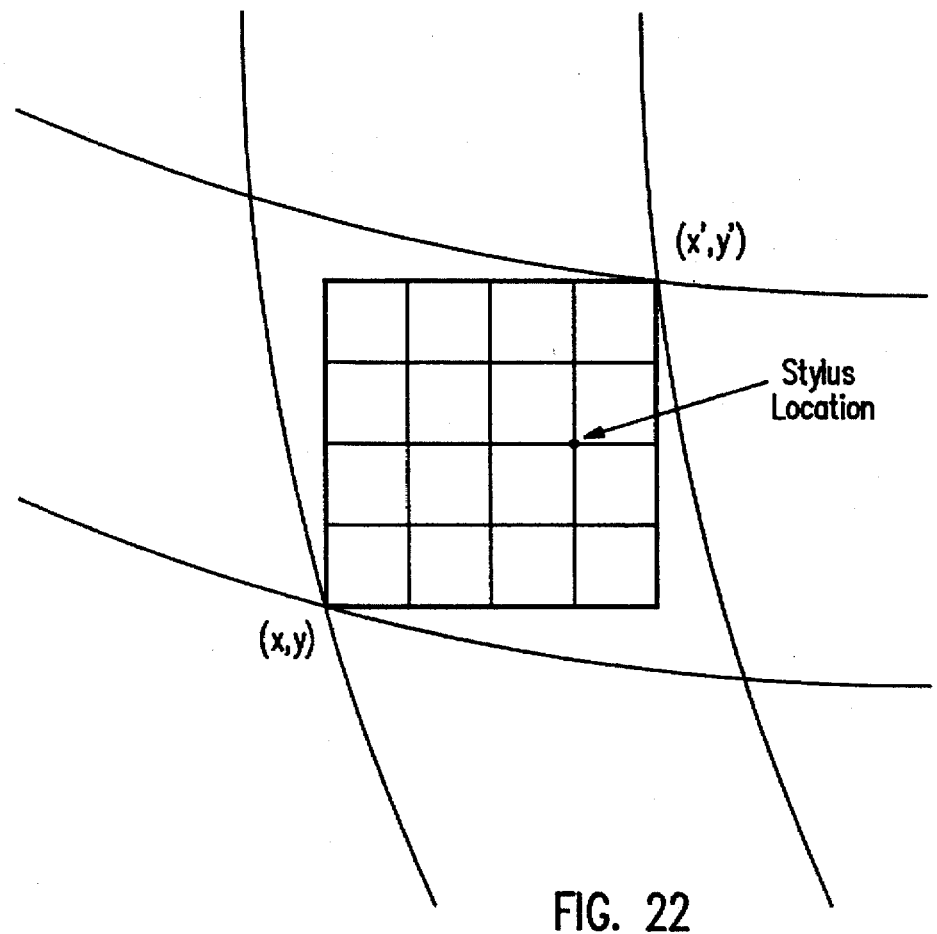
FIG. 22 illustrates the interpolation process using the two least significant digits of the words stored in the x and y counters.

Using the data control bus 197, microcontroller 190 retrieves the two 12-bit words representing the x and y coordinates from lookup table 66. Microcontroller 190 then increments the third bit in each of the words from counters 164 and 165 (see FIG. 21) by one and reads the values of the x and y coordinates stored at this address, designated (x', y') in FIG. 22. The two sets of x and y coordinates obtained from lookup table 66 represent the intersection points of adjacent pairs of hyperbolas on plate 61. These hyperbolas define a figure which closely approximates a square. To establish the position of stylus 60 within this figure, microcontroller 190 performs an interpolation using the two least significant bits of the words from counters 164 and 165. This is illustrated in FIG. 22, assuming that bits 1 and 2 in x-counter 164 represent a decimal 3 and bits 1 and 2 in y-counter 165 represent a decimal 2.

After the interpolation process has been performed, microcontroller 190 checks the 2-bit word from quadrant select logic 160 to determine the quadrant in which the stylus is located, and it uses this information to convert the stylus position into coordinates having their origin at the upper left corner of plate 61.

Separating plate 61 into quadrants reduces the required capacity of lookup table 66 by a factor of 4. Moreover, excluding the two least significant bits from the words stored in counter 164 and 165 from the addresses in lookup table 66 reduces the required capacity of lookup table 66 by an additional factor of 16. There is a trade-off between the capacity of lookup table 66 and the accuracy of the digitizer. A larger lookup table will provide a more accurate device; using more bits in the interpolation process introduces more inaccuracy. If a highly accurate device is desired, the interpolation process could be omitted entirely, and the entire contents of the x and y counters could be used in addressing the lookup table. Alternatively, the lookup table could be omitted, and microcontroller 19 could be programmed to solve the equations shown above for x and y. A wide variety of embodiments will be apparent to those skilled in the art, all of which are included within the broad principles of this invention.

After microcontroller 190 has determined the revised x and y coordinates based on an origin at the upper left corner of plate 61, it translates these coordinates into pixel coordinates for LCD plate 72 (FIG. 7B). These data are transmitted out through UART driver 67 (FIG. 6), which is programmed at a 19,200 baud rate. Alternatively, these data could be used in many different ways. For example, the data could be used by a computer to perform calculations. Essentially, the digitizer of this invention can be viewed as comparable to a keyboard or any other input device. Its digital output can be put to a wide variety of uses.

After the data have been transmitted, microcontroller 190 sends out a "sleep signal" and enters into a low power mode until it receives the next end of cycle interrupt ($\overline{INT0}$) from time out logic 167.

Figure 20A:
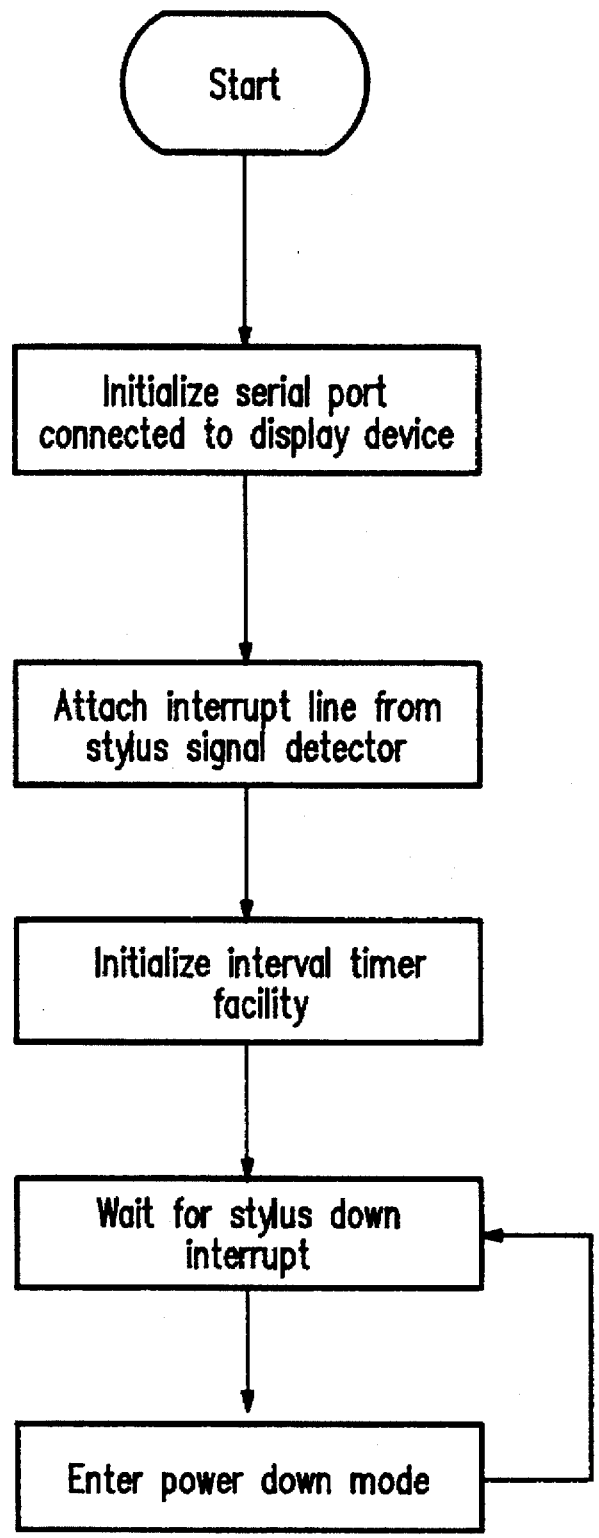
FIGS. 20A-20E illustrate a flowchart of the program for the microprocessor.

FIGS. 20A–20E illustrate a flowchart of the program run in microcontroller 190. The first four steps illustrated in FIG. 20A are initialization steps. The microcontroller then waits for an end of cycle interrupt ($\overline{INT0}$), which as noted above is generated by time out logic 167. Until $\overline{INT0}$ is received, the microcontroller enters a power down mode.

Figure 20B:
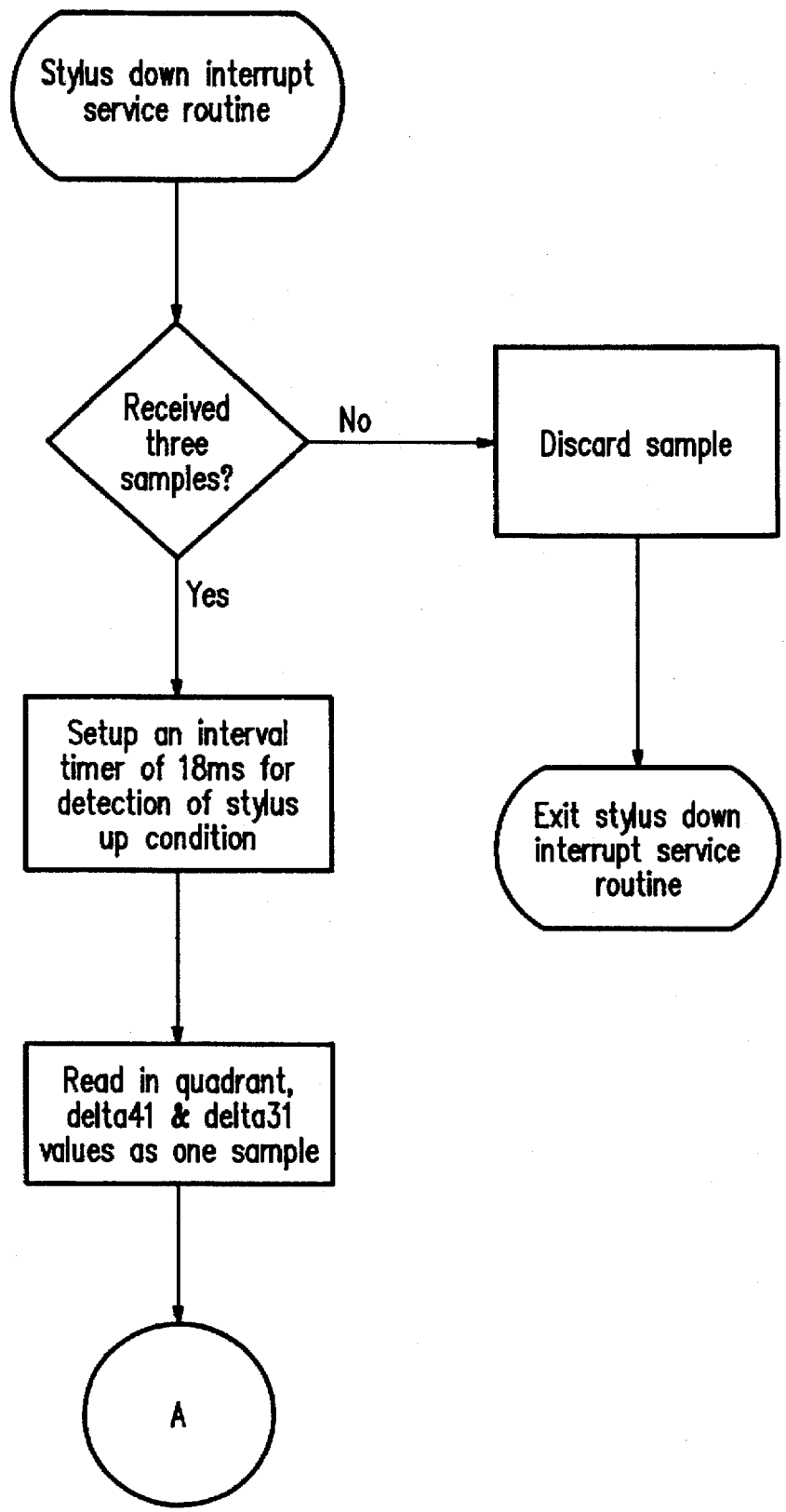

Receipt of the end of cycle interrupt initiates the routine illustrated in FIG. 20B. As the data are received, they are stored in a counter which is capable of holding three sets of data. The first two data samples are discarded. When the third data sample is received, the microcontroller sets up a timer to deliver a signal (designated TIMER0) after an interval of 18 msec and reads in the first data sample. This data sample includes the contents of x-counter 164 (11 bits) (identified as "delta 41"), y-counter 165 (10 bits) (identified as "delta 31"), and quadrant select logic 160 (2 bits).

Figure 20C:
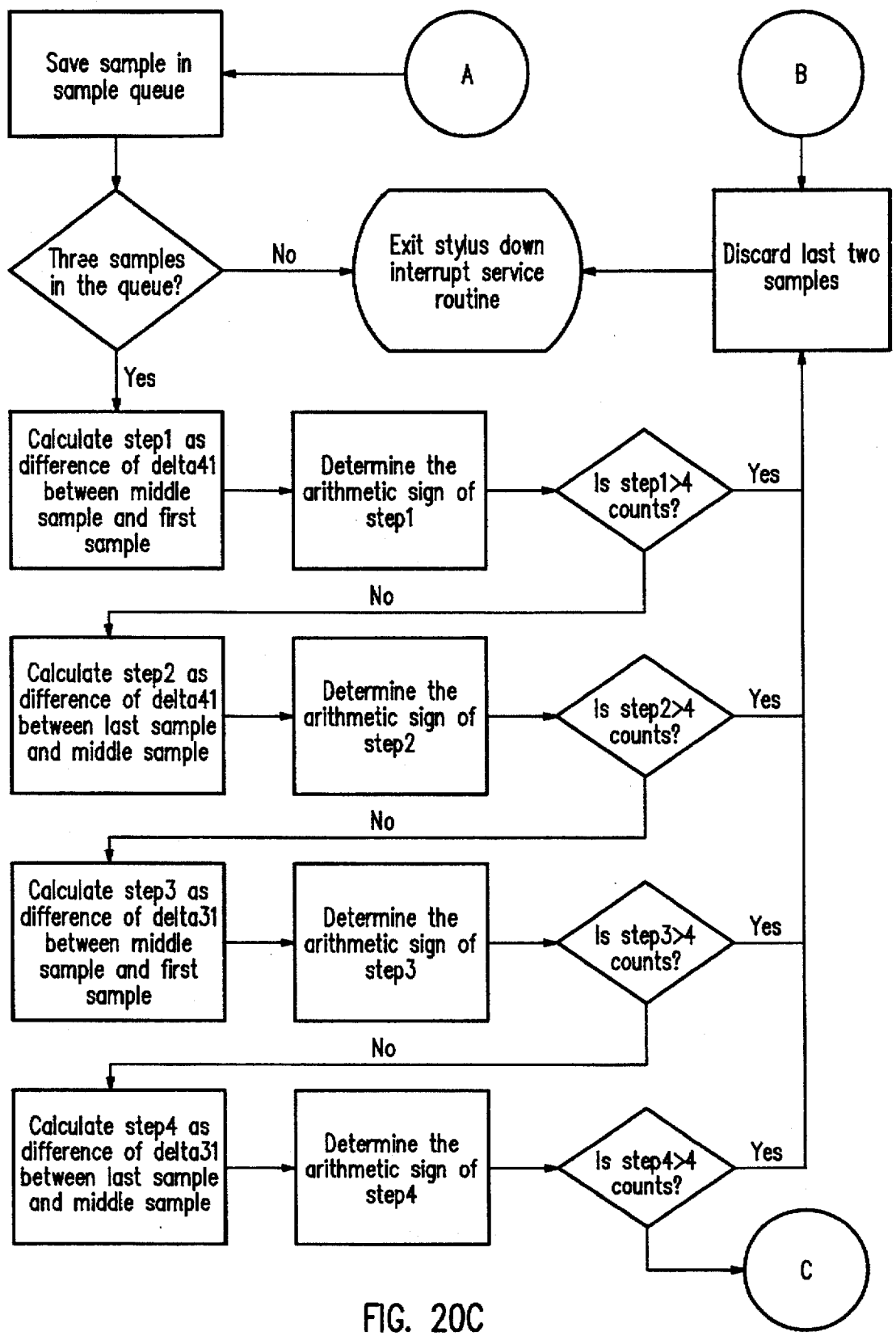

Microcontroller 190 then proceeds to the routine illustrated in FIG. 20C. Each data sample is stored in the counter referred to above. When three samples have been stored, the microcontroller proceeds to determine the difference between the delta 41 (i.e., the number stored in x-counter 164) of the first and middle samples and the middle and last samples. Then the same process is repeated for the delta 31s of the samples (i.e., the contents of y-counter 165). If any of these differences exceeds a determined amount (in this case, four counts) it is assumed that a spurious signal has been received, and the last two samples are discarded. The difference count beyond which the samples are discarded is determined by taking into account the maximum speed at which the stylus can realistically be moved along the surface of the plate. If the difference exceeds this value, then it is likely that an error has occurred and the final two data samples are discarded.

Figure 20D:
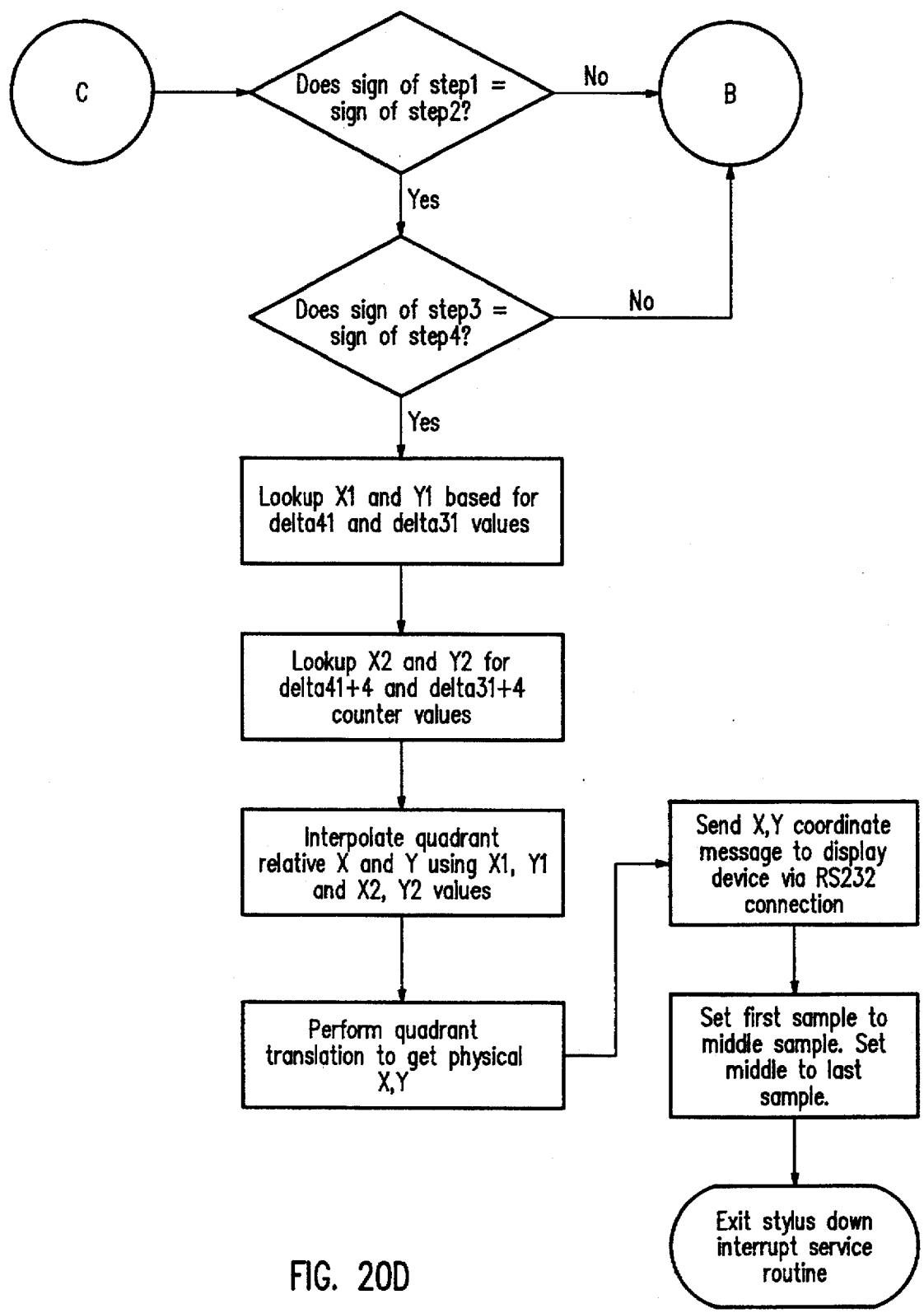

As indicated in FIG. 20C, the microcontroller also determines the arithmetic sign of the differences between the respective delta 41s and delta 31s of the data samples. As shown in FIG. 20D, if the sign changes for either the delta 41 or the delta 31, the final two samples are discarded. It may be possible to omit this portion of the program.

If there are no spurious samples, the microcontroller then retrieves the x and y coordinates of the stylus after truncating the two least significant bits from the values stored in x-counter 164 and y-counter 165. As noted above, the truncated samples are used to address memory locations in lookup table 66. The truncated counter values are then incremented by one (a total of four counts) and microcontroller 190 performs an interpolation using the two least significant bits of the contents of x-counter 164 and y-counter 165. The quadrant data (from quadrant select logic 160) is then used to obtain the x and y coordinates of the stylus, with the origin at the center of the plate. These coordinates are converted to coordinates having an origin at the upper left corner of the plate, and are sent to a host computer for generating "ink" under the stylus or other purposes. The data sample is then ejected from the counter and the remaining two samples are advanced.

At this point, the microprocessor enters an idle state wherein the timer which is to generate the TIMER0 signal is operating, but other systems are closed down to conserve power.

Figure 20E:
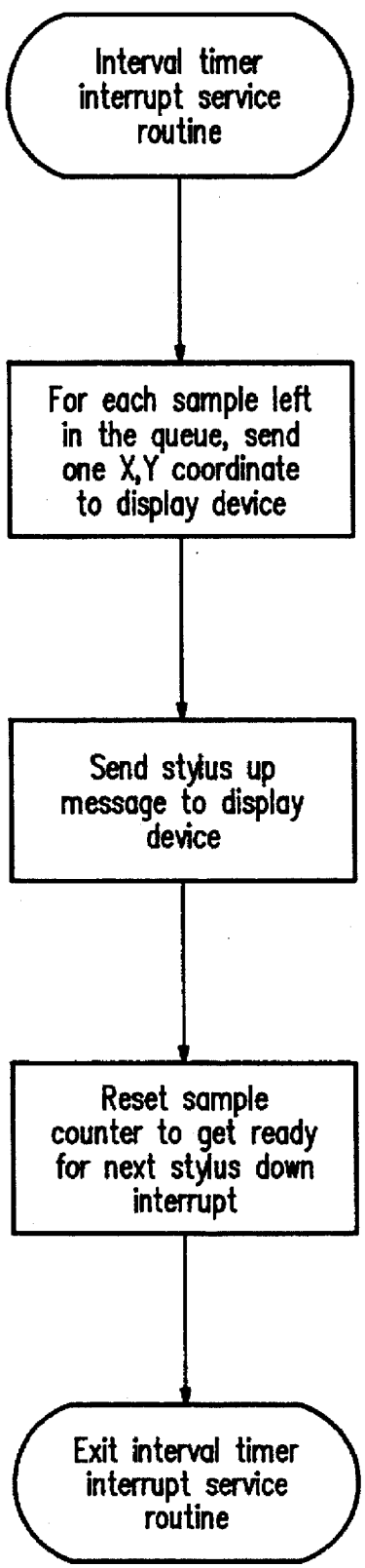

If the stylus remains in contact with the plate, a new end of cycle interrupt ($\overline{INT0}$) signal should be received within 8 msec after the data samples are advanced in the counter. If no end of cycle interrupt signal is received by the time the TIMER0 signal is generated, the data in the two samples remaining in the counter are processed as described above and x and y coordinates are sent to a host computer. This is illustrated in FIG. 20E. A "stylus up" signal is then generated and the sample counter is reset. Following the "stylus up" signal, microcontroller 90 and the host computer are in a "sleep mode" in which the only components which remain energized are the burst detectors 1–4 and other circuitry necessary to generate an end of cycle interrupt when the next burst is received. This will occur when the stylus is again brought into contact with the plate.

Other Embodiments

The design of other embodiments in accordance with this invention should take into account various factors which together determine the optimal design for a particular application. Among the most important of these factors are the following:
1. Whether the $A_o$ or $S_o$ waves are to be used individually, or whether the digitizer is to use both the $A_o$ and $S_o$ waves.
2. The amount of computational (processing) power available.
3. The number of detectors to be deployed.
4. The capacity of the look-up table, if one is to be used.

In the embodiment described above, for example, only the $A_o$ waves were used. This simplifies the detection process, because the $A_o$ waves are easier to detect than the $S_o$ waves; in addition, it is easier to detect a single type of wave than to distinguish between two different waves. Moreover, because the $A_o$ wave is slower than the $S_o$ wave, using the $A_o$ wave gives better resolution for a given clock frequency. On the other hand, using only a single wave prevents one from determining the time at which the burst originated at the stylus, and therefore precludes the possibility of calculating the actual lengths of the vectors. As is evidenced by equation (17) above, relying completely on the differences in vector lengths yields relatively complex equations for the values of the x and y coordinates. This in turn requires more processing power or a look-up table with a large capacity. Thus, in the embodiment described above, primary weight has been placed on simplifying the detection of the bursts.

Moreover, while the $A_o$ waves are easy to detect, as noted earlier $A_o$ waves exhibit considerable frequency dispersion (i.e., the phase and envelope velocities of the waves are different). Using $S_o$ waves would avoid this problem, since $S_o$ waves have low frequency dispersion.

The wide variety of embodiments which may be fabricated in accordance with the broad principles of this invention will be apparent to those skilled in the art.

Figure 23:
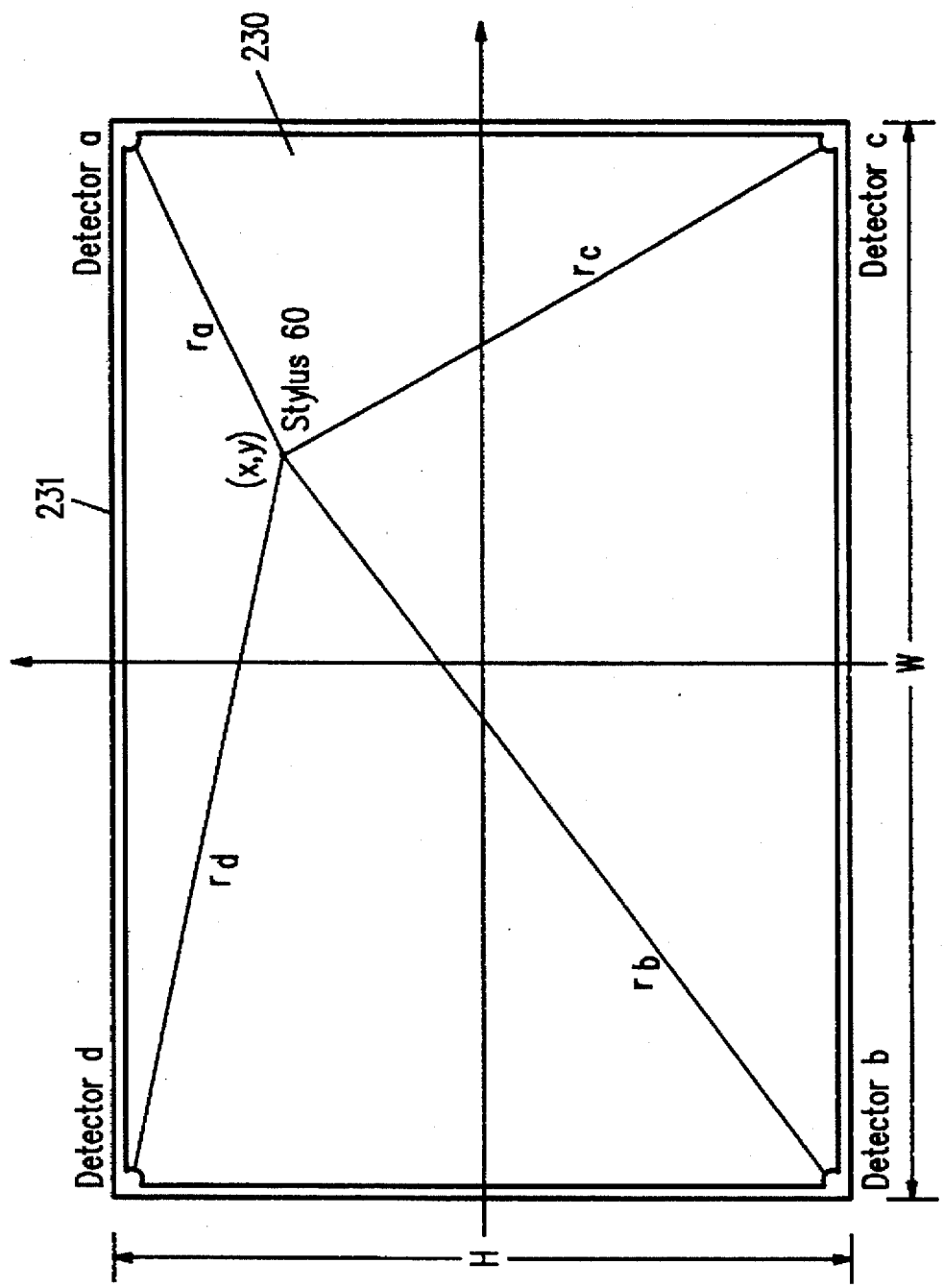
FIG. 23 illustrates a plan view of the plate in a second embodiment according to the invention.

FIG. 23 illustrates a plan view of the plate in an embodiment in which four detectors a, b, c and d are capable of detecting both the $A_o$ and $S_o$ waves. Plate 230 may be a plate of glass similar to plate 61 described above, and a dampening material 231, similar to dampening material 71 described above, is bonded to the edges of plate 230. Stylus 60 is identical to the stylus shown in FIG. 8.

Let $c_s$ and $c_p$ represent the velocities of the $A_o$ and $S_o$ waves, respectively, and $t_s$ and $t_f$ represent the time it takes for the $A_o$ and $S_o$ waves to travel from stylus 60 to one of detectors a–d. The length r of the vector from stylus 60 to one of the detectors is:

$$r = c_s t_s = c_p t_f \qquad (18)$$

Therefore, $$t_f = \frac{t_s c_s}{c_p} \qquad (19)$$

Manipulating and rearranging equations (18) and (19), we get:

$$r = \frac{c_p c_s}{c_p - c_s}(t_s - t_f) \qquad (20)$$

where $t_s - t_f$ represents the elapsed time between the arrival of the $S_o$ and $A_o$ wave bursts at the detector. The value of the factor multiplying this difference is a constant characteristic of the transmission medium.

Since the absolute lengths of the vectors can be determined, the sum of as well as the difference between the lengths of the vectors connecting the stylus and two of detectors a–d can be used. To simplify matters, let $$r_m - r_n = \Delta_{mn} \qquad (21)$$

$$r_m + r_n = \Sigma_{mn} \qquad (22)$$

where $r_m$ and $r_n$ are the distances between the stylus and any two detectors m and n. Subtracting equation (3) from equation (6) yields (after converting $r_1$ to $r_a$, $r_2$ to $r_b$, etc.):

$$r_d^2 - r_a^2 = \left(\frac{W}{2} + x\right)^2 - \left(\frac{W}{2} - x\right)^2 = 2Wx \qquad (23)$$

After rearranging terms:

$$x = \frac{r_d^2 - r_a^2}{2W} = \frac{\Delta_{da}\Sigma_{da}}{2W} \qquad (24)$$

The expression for y is derived by subtracting equation (3) from equation (5)

$$r_c^2 - r_a^2 = \left(\frac{H}{2} + y\right)^2 - \left(\frac{H}{2} - y\right)^2 = 2Hy \qquad (25)$$

Again rearranging terms $$y = \frac{r_c^2 - r_a^2}{2H} = \frac{\Delta_{ca}\Sigma_{ca}}{2H} \qquad (26)$$

Thus, sensing the arrival of the $A_o$ and $S_o$ waves and determining the absolute values of the vectors allows one to define the x and y coordinates by very simple mathematical formulas. This greatly reduces the processing power required as compared with the case where only the differences in the vector lengths is detected.

Various detector arrangements allow the detection of the sum of and/or the difference in the length of vectors drawn between the stylus location and detector pairs. Equation (21) defines a hyperbola whose foci are at the two detector locations, and equation (22) defines an ellipse whose foci are at the two detector locations. In the various embodiments of this invention, the function of the logic circuitry is to find the x and y coordinates which correspond to the intersection point of two curves. The curves may both be hyperbolas, they may both be ellipses, or one may be a hyperbola and the other an ellipse. The number of detectors used may be two, three, four or more. The particular hyperbolas or ellipses used may be varied, depending on the position of the stylus on the plate. The accuracy of the digitizer is improved by insuring that the particular families of curves selected intersect each other as orthogonally as possible.

In each instance, the particular family of curves must be defined in terms of the x and y coordinates and a constant, representing the vector sum or vector difference which defines a particular curve in the family. The two equations are then solved for x and y. Listed in Appendix A are the equations for the hyperbolas and ellipses having their foci at the corners of a rectangular plate. In each instance, the origin (0,0) is at the center of the plate.

The embodiments described above are intended to be illustrative and not limiting. Many additional embodiments in accordance with the broad principles of this invention will be apparent to those skilled in the art. The scope of this invention is to be limited only by the claims which follow.

APPENDIX A

Note: Layout of detectors is as shown in FIG. 23

1. Hyperbolas having detectors a and c as foci ($\Delta_{ca}$ detected):

$$y = \frac{\Delta_{ca}}{2} \left[ 1 + \frac{(W-2x)^2}{H_2 - \Delta_{ca}^2} \right]^{1/2}$$

2. Hyperbolas having detectors a and b as foci ($\Delta_{ba}$ detected):

$$y = \frac{-2Whx \pm [\Delta_{ba}^2 (W^2 + H^2 - \Delta_{ba}^2)(4x^2 + H^2 - \Delta_{ba}^2)]^{1/2}}{2(H^2 - \Delta_{ba}^2)}$$

3. Hyperbolas having detectors b and c as foci ($\Delta_{bc}$ detected):

$$y = \left[ \frac{W^2 - \Delta_{bc}^2}{\Delta_{bc}^2} \left( x^2 - \frac{\Delta_{bc}^2}{4} \right) \right]^{1/2} - \frac{H}{2}$$

4. Hyperbolas having detectors a and d as foci ($\Delta_{da}$ detected):

$$y = \frac{H}{2} - \left[ \frac{W^2 - \Delta_{da}^2}{\Delta_{da}^2} \left( x^2 - \frac{\Delta_{da}^2}{4} \right) \right]^{1/2}$$

5. Ellipses having detectors a and c as foci ($\Sigma_{ca}$ detected):

$$y = \pm \frac{\Sigma_{ca}}{2} \left[ 1 - \frac{(W-2x)^2}{\Sigma_{ca}^2 - H^2} \right]^{1/2}$$

6. Ellipses having detectors a and b as foci ($\Sigma_{ba}$ detected):

$$y = \frac{-2Whx \pm [\Sigma_{ba}^2 (W^2 + H^2 - \Sigma_{ba}^2)(4x^2 + H^2 - \Sigma_{ba}^2)]^{1/2}}{2(H^2 - \Sigma_{ba}^2)}$$

7. Ellipses having detectors b and c as foci ($\Sigma_{bc}$ detected):

$$y = \left[ \frac{\Sigma_{bc}^2 - W^2}{\Sigma_{bc}^2} \left( \frac{\Sigma_{bc}^2}{4} - x^2 \right) \right]^{1/2} - \frac{H}{2}$$

8. Ellipses having detectors a and d as foci ($\Sigma_{da}$ detected):

$$y = \frac{H}{2} - \left[ \frac{\Sigma_{bc}^2 - W^2}{\Sigma_{bc}^2} \left( \frac{\Sigma_{bc}^2}{4} - x^2 \right) \right]^{1/2} - \frac{H}{2}$$

We claim:

1. A device for providing a digital representation of the location of a stylus on a plate, said device comprising:
   a solid plate;
   an untethered stylus for introducing a burst of acoustic waves into said plate;
   a plurality of detectors positioned on said plate, each of said detectors for detecting the arrival of said burst of acoustic waves introduced into said plate by said stylus;
   a first means for determining a difference in the respective arrival times of said burst at individual detectors in a first pair of said detectors; and
   a second means for determining a difference in the respective arrival times of said burst at individual detectors in a second pair of said detectors, wherein at least one of said detectors in said second pair of detectors is not included in said first pair of detectors.

2. The device of claim 1 wherein said plate is rectangular and said detectors are positioned at the corners of said plate.

3. The device of claim 1 wherein said difference in the arrival times of said burst at the individual detectors in said first pair of detectors defines a hyperbolic curve on a said plate.

4. The device of claim 1, each of said detectors comprising a piezoelectric member attached to said plate.

5. The device of claim 4, each of piezoelectric members comprising a ceramic material.

6. The device of claim 4, each of said piezoelectric members being backed by an acoustic dampening material.

7. The device of claim 1 wherein said stylus is capable of introducing a series of bursts into said plate, said bursts each having a duration, said device comprising burst detection circuitry for generating an output at substantially the same point within the duration of each burst.

8. The device of claim 7 wherein said burst detection circuitry is adapted to generate said output when the voltage level in one of said bursts equals a selected percentage of the peak voltage level of a preceding burst.

9. The device of claim 7, said burst detection circuitry comprising:
   a peak and hold circuit connected to a first input of a comparator; and a sample, hold and scale circuit connected to a second input of said comparator;

said sample, hold and scale circuit having a decay rate lower than a decay rate of said peak and hold circuit.

10. The device of claim 9 comprising a low-pass filter connected between said first peak and hold circuit and said first input of said comparator.

11. The device of claim 1, said stylus comprising a piezoelectric element for generating a mechanical vibration at a predetermined frequency.

12. The device of claim 11, said piezoelectric element comprising a ceramic material.

13. The device of claim 11, said piezoelectric element being connected to a tuned circuit.

14. The device of claim 13, said tuned circuit being connected to a relaxation oscillator.

15. The device of claim 1, said stylus comprising a battery.

16. The device of claim 1, said stylus having a spherical or spheroidal tip.

17. The device of claim 1, said plate comprising glass.

18. The device of claim 1, a dampening material being attached to said plate along or at least a portion of the periphery thereof, said dampening material being for preventing said acoustic waves from being reflected from said periphery back to the interior of said plate.

19. The device of claim 18 wherein said dampening material comprises tungsten particles.

20. The device of claim 3, said first means comprising a counter, said counter being turned on by the arrival of said burst at one of said individual detectors in said first pair of detectors and being turned off by the arrival of said burst at the other of said individual detector in said first pair of detectors.

21. The device of claim 2, said plate being divided into four quadrants, said device comprising means for providing a signal indicating in which of said quadrants said stylus is located.

22. The device of claim 21, said signal being in the form of a binary word.

23. The device of claim 22 wherein said quadrants are separated by orthogonal lines and only a single bit of said binary word changes when said stylus crosses any one of said lines.

24. The device of claim 1 further comprising:

a third means for detecting at which of said detectors said burst arrives first; and a fourth means for computing the position of said stylus from an output of said first means, an output of said second means, and an output of said third means.

25. The device of claim 24, wherein said first means comprises a first counter and said second means comprises a second counter, said device further comprising a look-up table containing stored data, the data stored in said look-up table corresponding to the coordinates of positions of said stylus on said plate.

26. The device of claim 25, at least a portion of respective binary words held in said first and second counters being used to address data storage locations in said look-up table.

27. The device of claim 26 wherein only a portion of the respective binary words held in said first and second counters is used to address data storage locations in said look-up table, said device further comprising a means for interpolating between two locations on said plate, portions of said respective binary words not used to address data storage locations in said look-up table supplied to said means for interpolating.

28. The device of claim 27 wherein the portions of said respective binary word that are supplied to said means for interpolating comprise primary bits of less significance than the portions of said binary words used to address data storage locations in said look-up table.

29. The device of claim i wherein said acoustic waves are Lamb waves of the symmetrical mode.

30. The device of claim 29 wherein said detectors are attached to a top surface of said plate.

31. The device of claim 30 wherein said detectors are attached to a bottom surface of said plate.

32. The device of claim 1 wherein said acoustic waves are Lamb waves of the antisymmetrical mode.

33. The device of claim 1 wherein said detectors are attached to edges of said plate.

34. The device of claim 1, said first means comprising a counter, said counter being started by the arrival of said burst at a first one of said individual detectors in said first pair, said counter being stopped by the arrival of said burst at a second one of said individual detectors in said first pair.

35. The device of claim 1, said burst comprising a fast wave and a slow wave, said means for determining the position of said stylus comprising means for determining the distance between stylus and one of said detectors from the difference between the arrival times of said fast and slow waves, respectively, at said one of said detectors.

36. The device of claim 35, said means for determining the position of said stylus comprising means for determining the distance between said stylus and another one of said detectors from the difference between the arrival times of said fast and slow waves, respectively, at said another one of said detectors.

37. The device of claim 34 comprising a means for preventing said counter from recycling in the event that a spurious signal is received at one of said detectors.

38. The device of claim 37 wherein said means for preventing comprises a stage of said counter which is not operative in the absence of said spurious signal.

39. The device of claim 38 wherein said stage of said counter is connected to circuitry which causes said counter to be reset.

40. A device for providing a digital representation of the location of a stylus on a plate, said device comprising:

a solid plate;

a stylus including a vibrating element;

a plurality of acoustic wave detectors located on said plate;

a first counter, said first counter being triggered by the arrival of an acoustic wave at one of said detectors in a first pair of said detectors and being stopped by the arrival of said acoustic wave at the other detector in said first pair of said detectors;

a second counter, said second counter being triggered by the arrival of an acoustic wave at one of said detectors in a second pair of said detectors and being stopped by the arrival of said acoustic wave at the other detector in said second pair of said detectors, wherein said second pair of said detectors includes at least one of said detectors that is not included in said first pair of said detectors; and a microprocessor connected to said first and second counters, said microprocessor being programmed so as to compute a position of said stylus on said plate.

41. The device of claim 40, said first counter being triggered by the arrival of an acoustic wave at a first one of said detectors and stopped by the arrival of said acoustic wave at a second one of said detectors, and said second counter being triggered by the arrival of an acoustic wave at said second one of said detectors and stopped by the arrival of said acoustic wave at a third one of said detectors.

42. The device of claim 41, said plate being rectangular, said detectors being positioned at the corners of said plate, said second one of said detectors being positioned on a line defined by a first side of said plate, and said third one of said detectors being positioned on a line defined by a second side of said plate perpendicular to said first side, said first one of said detectors being positioned at a corner of said plate that is formed by an intersection of said first and second sides of said plate.

43. A method of generating an electrical signal representative of the position of a stylus on a plate, said method comprising the steps of:

providing a plate;

providing a memory having a plurality of data storage locations, each of said data storage locations being identified by a pair of addresses;

programming each of said data storage locations of said memory with coordinates representing a position on said plate;

positioning a stylus such that a tip of said stylus is in contact with said plate, a point of contact between said tip and said plate defining a position of said stylus on said plate;

generating two binary words approximating the position of said stylus on said plate;

removing a predetermined number of bits from each of said binary words, leaving truncated binary words;

using said truncated binary words to address a first data storage location in said memory;

reading a first set of coordinates stored at said first data storage location, said first set of coordinates defining a first position on said plate;

incrementing said truncated binary words to form incremented truncated binary words;

using said incremented truncated binary words to address a second data storage position in said memory;

reading a second set of coordinates stored at said second data storage location, said second set of coordinates defining a second position on said plate;

using the bits removed from each of said binary words to identify, a third position on said plate, said third position representing the position of said stylus on said plate; and generating an electrical signal representative of said third position on said plate.

44. The device of claim 38 wherein said fast wave comprises a symmetrical wave and said slow wave comprises an antisymmetrical wave.

* * * * *